(12) United States Patent
Srivastava et al.

(10) Patent No.: US 9,454,151 B2
(45) Date of Patent: Sep. 27, 2016

(54) USER INTERFACES FOR SELECTING UNMANNED AERIAL VEHICLES AND MISSION PLANS FOR UNMANNED AERIAL VEHICLES

(71) Applicant: Verizon Patent and Licensing Inc., Arlington, VA (US)

(72) Inventors: Ashok N. Srivastava, Mountain View, CA (US); Douglas M. Pasko, Bridgewater, NJ (US); Hani Batla, Teaneck, NJ (US); Igor Kantor, Raleigh, NC (US); Gurpreet Ubhi, Nutley, NJ (US)

(73) Assignee: VERIZON PATENT AND LICENSING INC., Basking Ridge, NJ (US)

( * ) Notice: Subject to any disclaimer, the term of this patent is extended or adjusted under 35 U.S.C. 154(b) by 516 days.

(21) Appl. No.: 14/282,249

(22) Filed: May 20, 2014

(65) Prior Publication Data
US 2016/0111006 A1    Apr. 21, 2016

(51) Int. Cl.
     *G05D 1/00*      (2006.01)
     *G06Q 10/08*      (2012.01)

(52) U.S. Cl.
     CPC ............. *G05D 1/00* (2013.01); *G05D 1/0094* (2013.01); *G06Q 10/083* (2013.01); *B64C 2201/12* (2013.01); *B64C 2201/126* (2013.01)

(58) Field of Classification Search
None
See application file for complete search history.

(56) References Cited

U.S. PATENT DOCUMENTS

| | | | |
|---|---|---|---|
| 9,022,324 B1 * | 5/2015 | Abhyanker | B64C 13/20 244/189 |
| 9,125,987 B2 * | 9/2015 | Levien | G05D 1/00 |
| 9,162,763 B1 * | 10/2015 | Tofte | B64C 39/024 |
| 9,170,117 B1 * | 10/2015 | Abuelsaad | G01C 21/34 |
| 2006/0074557 A1 * | 4/2006 | Mulligan | B64C 39/024 701/13 |
| 2014/0024999 A1 * | 1/2014 | Levien | G05D 1/00 604/66 |
| 2014/0025233 A1 * | 1/2014 | Levien | G05D 1/00 701/3 |

(Continued)

OTHER PUBLICATIONS

Redding et al., "Distributed Multi-Agent Persistent Surveillance and Tracking with Health Management", American Institute Aeronautics and Astronautics, AIAA Guidance, Navigation, and Control Conference, 2011, 18 pages.

(Continued)

*Primary Examiner* — John Q Nguyen
*Assistant Examiner* — Edward Torchinsky

(57) ABSTRACT

A device receives a request for a mission that includes traversal of a flight path and performance of mission operations, and presents a first user interface that requests mission information. The device receives the mission information, and determines recommended UAVs for the mission based on the mission information. The device presents information associated with the recommended UAVs, and receives a selection of a particular UAV via the first user interface. The device determines recommended mission plans based on the mission information and the particular UAV, and presents the recommended mission plans via a second user interface. The device receives a selection of a particular mission plan via the second user interface, and generates mission plan instructions for the particular mission plan. The device provides the mission plan instructions to the particular UAV to permit the particular UAV to travel the flight path and perform the mission operations.

20 Claims, 14 Drawing Sheets

(56) References Cited

U.S. PATENT DOCUMENTS

| | | | |
|---|---|---|---|
| 2014/0025234 A1* | 1/2014 | Levien | G05D 1/00 701/3 |
| 2014/0025235 A1* | 1/2014 | Levien | G05D 1/00 701/3 |
| 2014/0025236 A1* | 1/2014 | Levien | G05D 1/00 701/3 |
| 2014/0032034 A1* | 1/2014 | Raptopoulos | G08G 5/0069 701/25 |
| 2015/0120094 A1* | 4/2015 | Kimchi | B64C 39/024 701/3 |
| 2015/0226575 A1* | 8/2015 | Rambo | B64C 39/024 701/523 |
| 2015/0329205 A1* | 11/2015 | Hanna | B64C 39/024 244/63 |
| 2015/0370250 A1* | 12/2015 | Bachrach | G05D 1/0016 701/2 |

OTHER PUBLICATIONS

Richards et al., "Model Predictive Control of Vehicle Maneuvers with Guaranteed Completion Time and Robust Feasibility", American Control Conference, 2003, Proceedings of the 2003, vol. 5, IEEE, 2003, 7 pages.

Park et al., "Agent Technology for Coordinating UAV Target Tracking", Knowledge-Based Intelligent Information and Engineering Systems, Springer Berlin Heidelberg, 2005, 8 pages.

Kuwata et al., "Three Dimensional Receding Horizon Control for UAVs", AIAA Guidance, Navigation, and Control Conference and Exhibit, Aug. 16-19, 2004, 14 pages.

Alighanbari et al., "Filter-Embedded UAV Task Assignment Algorithms for Dynamic Environments", AIAA Guidance, Navigation, and Control Conference and Exhibit, Aug. 16-19, 2004, 15 pages.

Saad et al., "Vehicle Swarm Rapid Prototyping Testbed", American Institute of Aeronautics and Astronautics, Aerospace Conference and AIAA Unmanned . . . Unlimited Conference, 2009, 9 pages.

Richards et al., "Decentralized Model Predictive Control of Cooperating UAVs", $43^{rd}$ IEEE Conference on Decision and Control, vol. 4, IEEE, 2004, 6 pages.

Bertuccelli et al., "Robust Planning for Coupled Cooperative UAV Missions", $43^{rd}$ IEEE Conference on Decision and Control, vol. 3, IEEE, 2004, 8 pages.

Toksoz et al., "Automated Battery Swap and Recharge to Enable Persistent UAV Missions", AIAA Infotech@ Aerospace Conference, 2011, 10 pages.

How et al., "Multi-vehicle Experimental Platform for Distributed Coordination and Control", http://web.mit.edu/people/ihow/durip1.html, Apr. 1, 2004, 4 pages.

Chung Tin, "Robust Multi-UAV Planning in Dynamic and Uncertain Environments", Massachusetts Institute of Technology, 2004, 110 pages.

How et al., "Flight Demonstrations of Cooperative Control for UAV Teams", AIAA $3^{rd}$ "Unmanned Unlimited" Technical Conference, Workshop and Exhibit, Sep. 20-23, 2004, 9 pages.

Wikipedia, "Waze", http://en.wikipedia.org/wiki/Waze, Mar. 30, 2014, 6 pages.

Choi et al., "Information deliver scheme of micro UAVs having limited communication range during tracking the moving target" The Journal of Supercomputing, vol. 66, Issue 2, 2013, pp. 950-972.

Boyd et al., "Convex Optimization", Cambridge University Press, 2004, 730 pages.

* cited by examiner

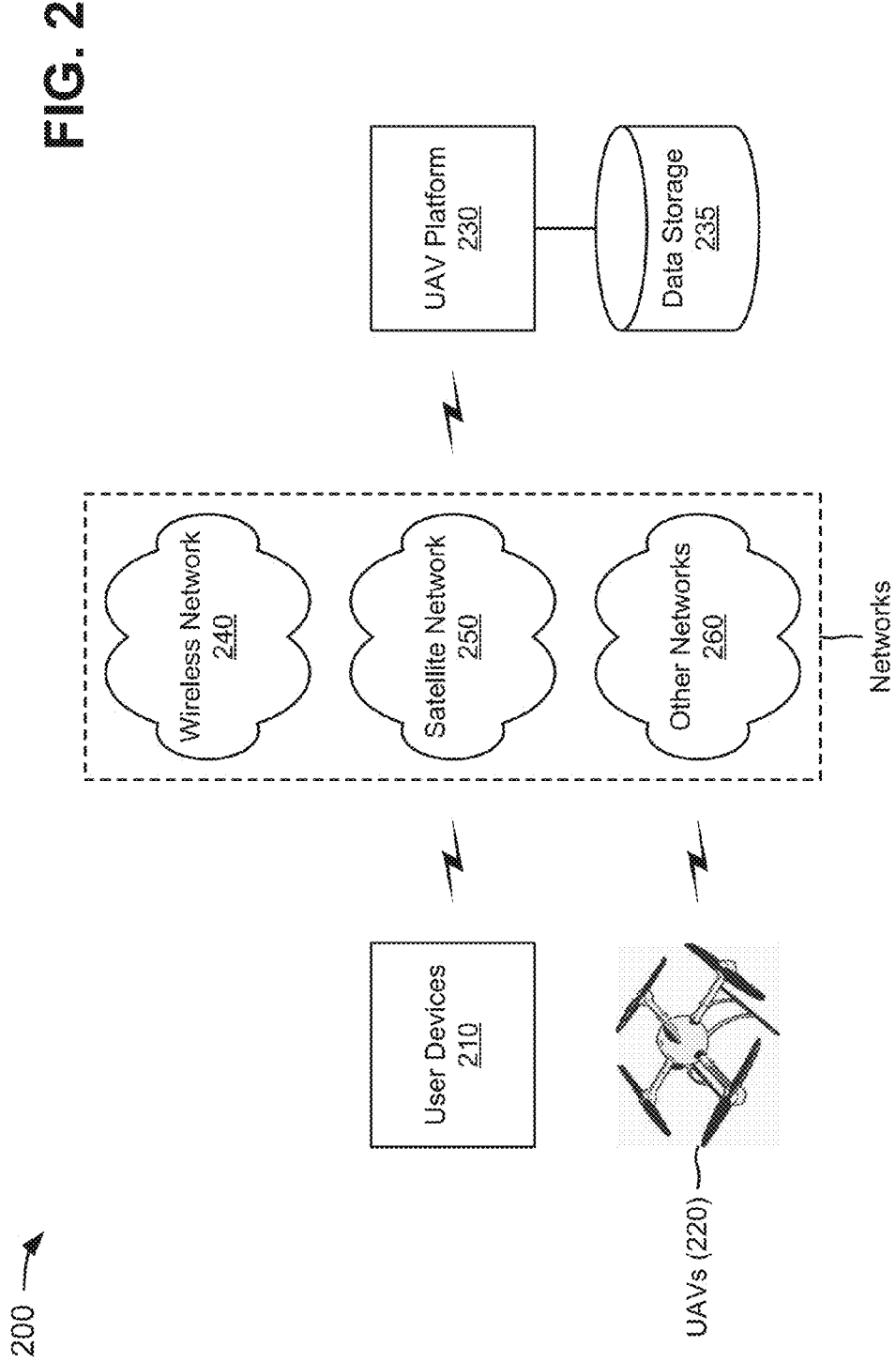

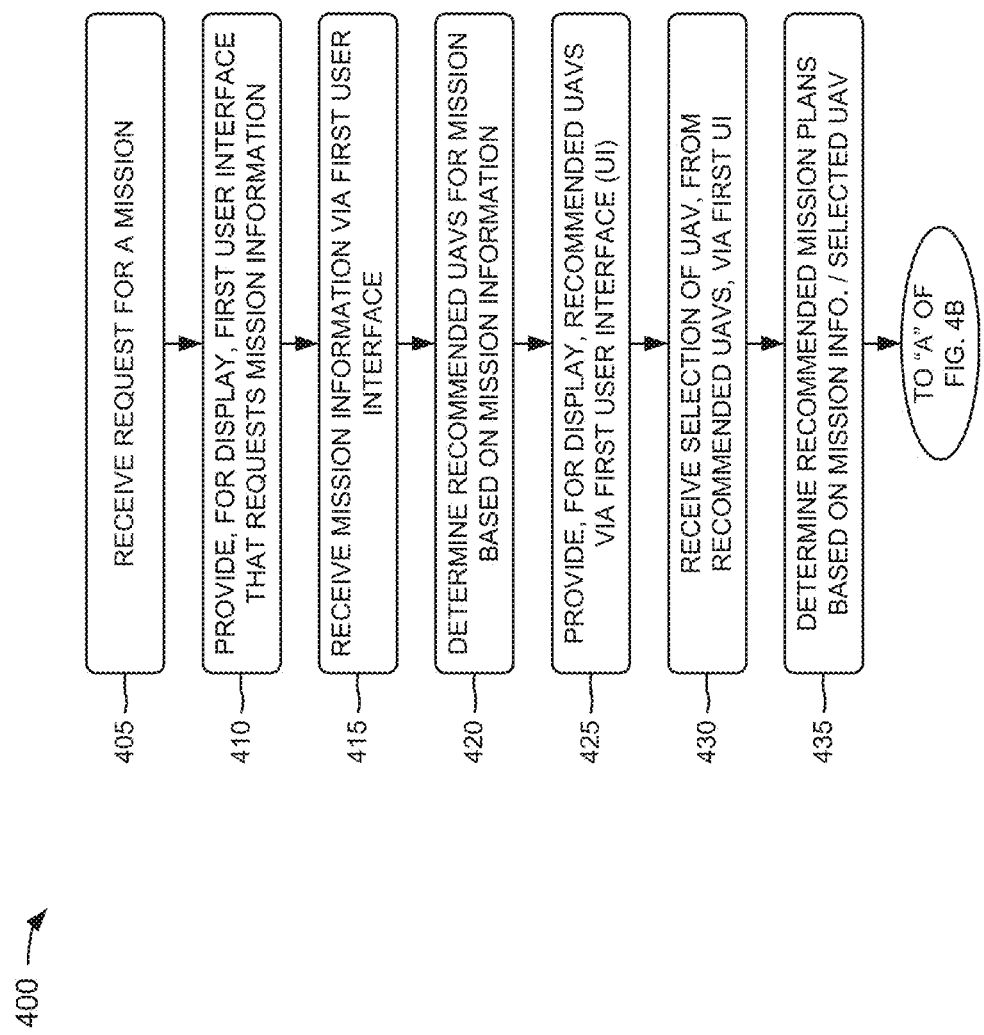

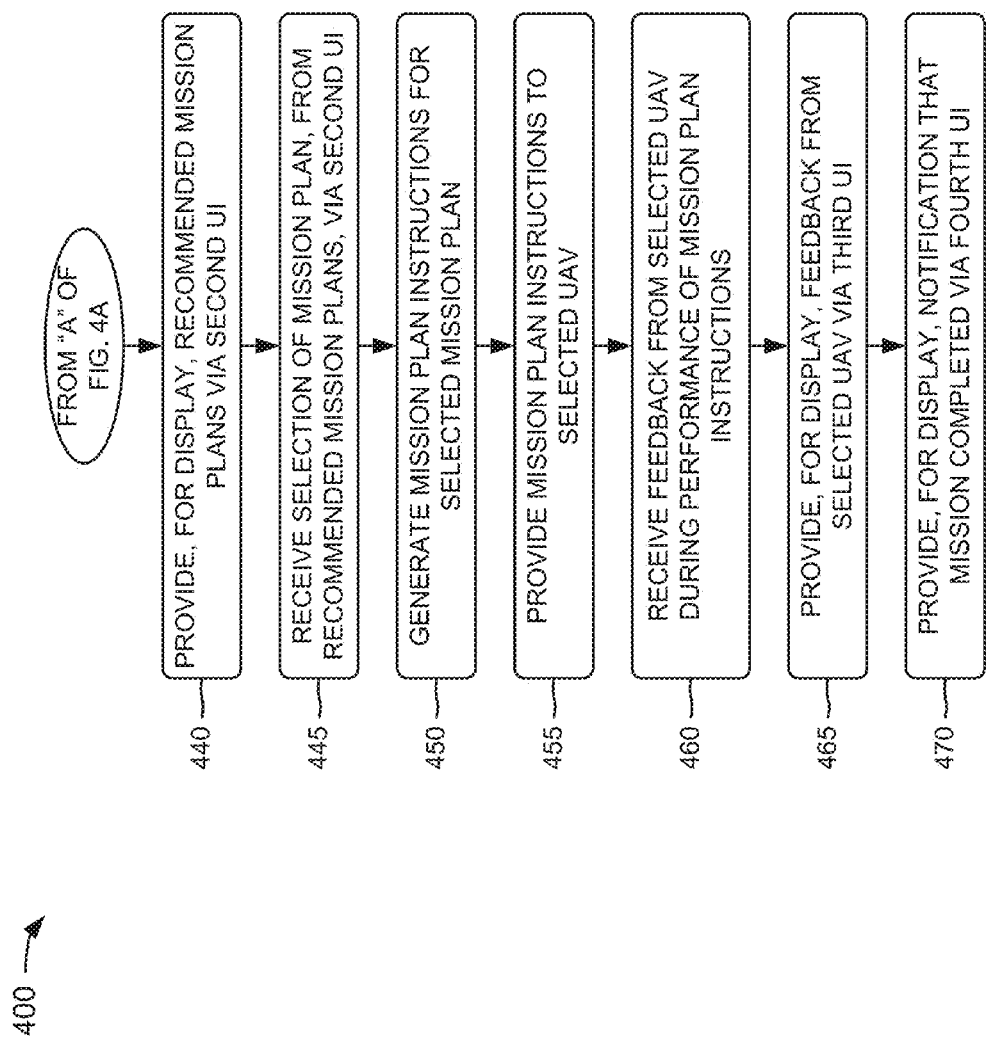

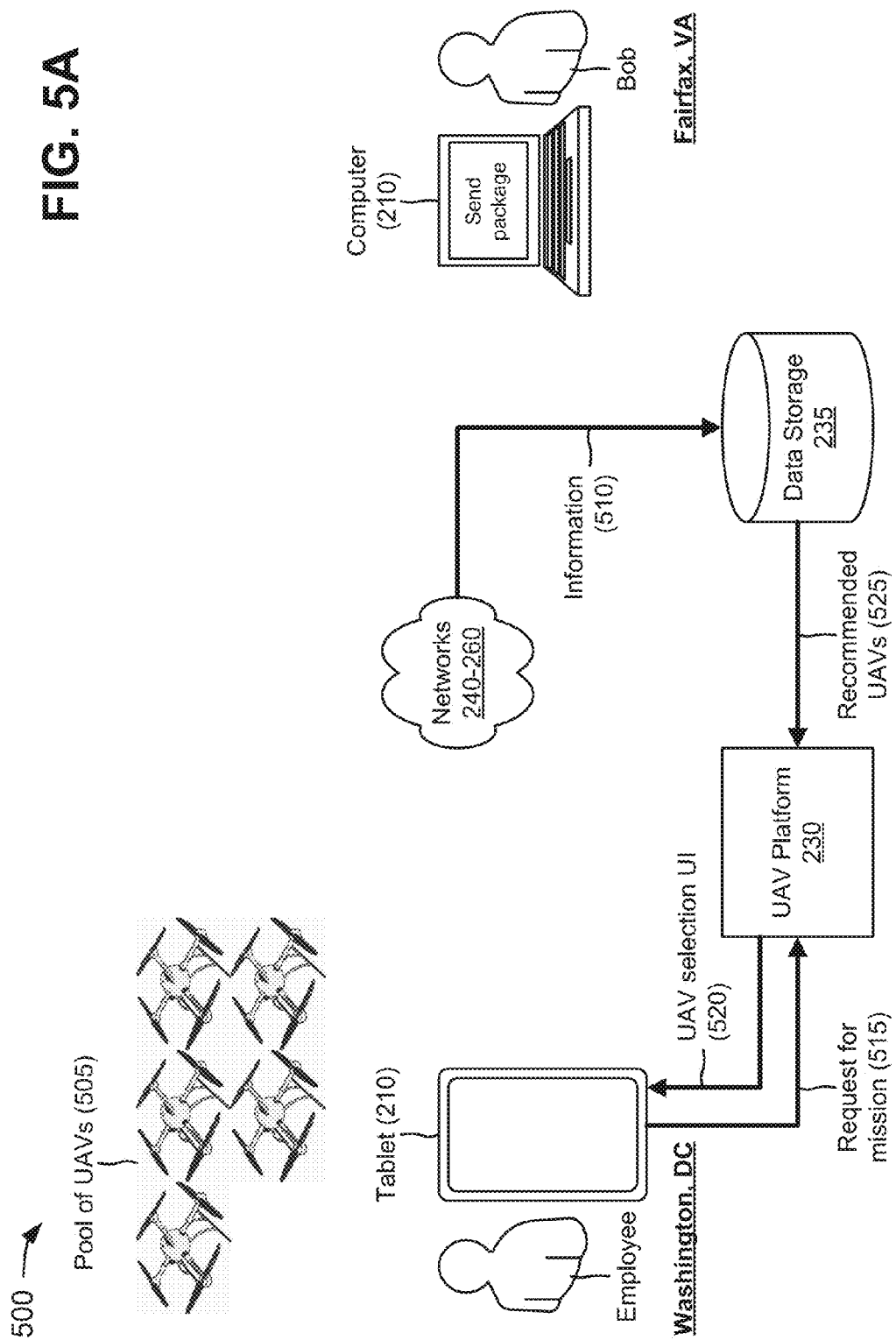

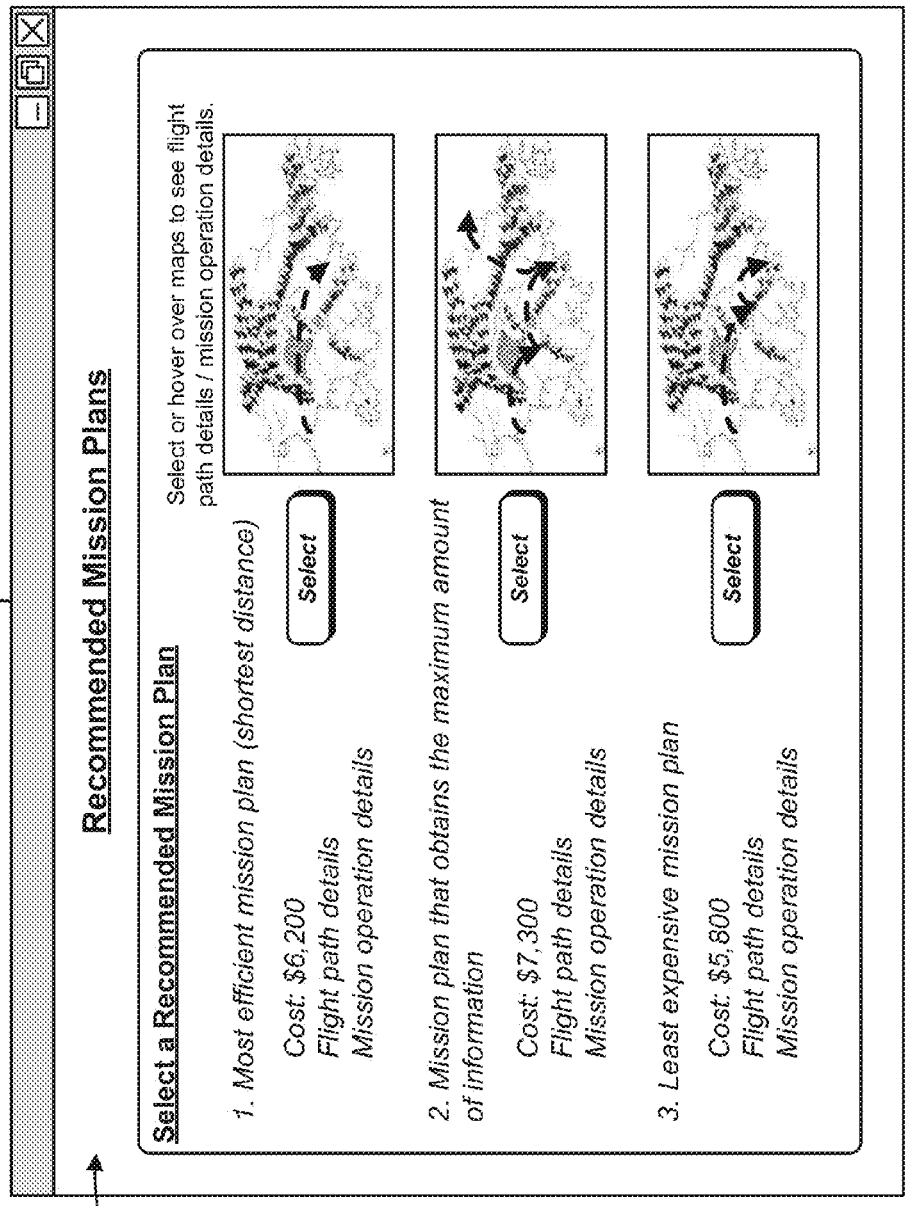

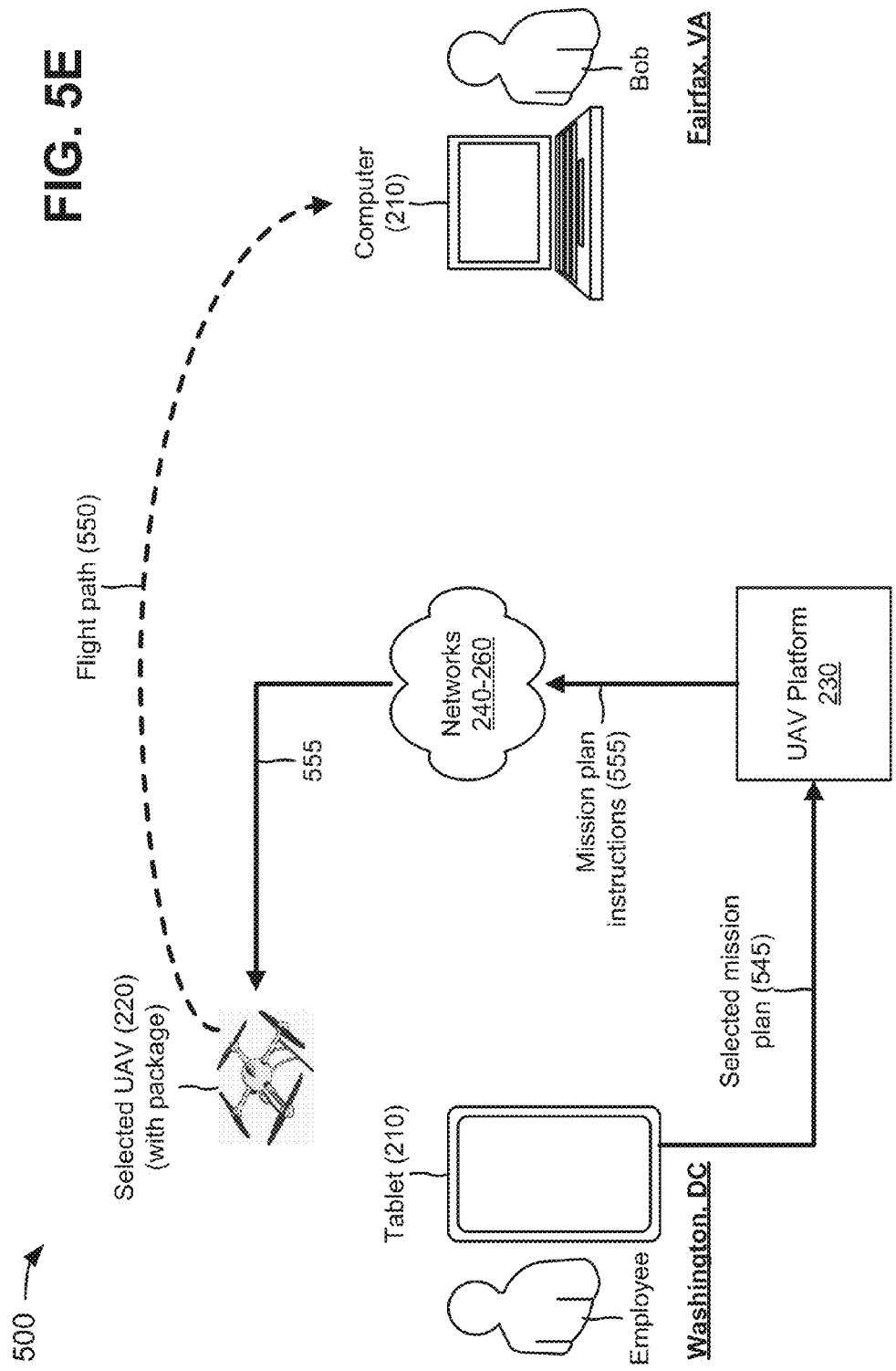

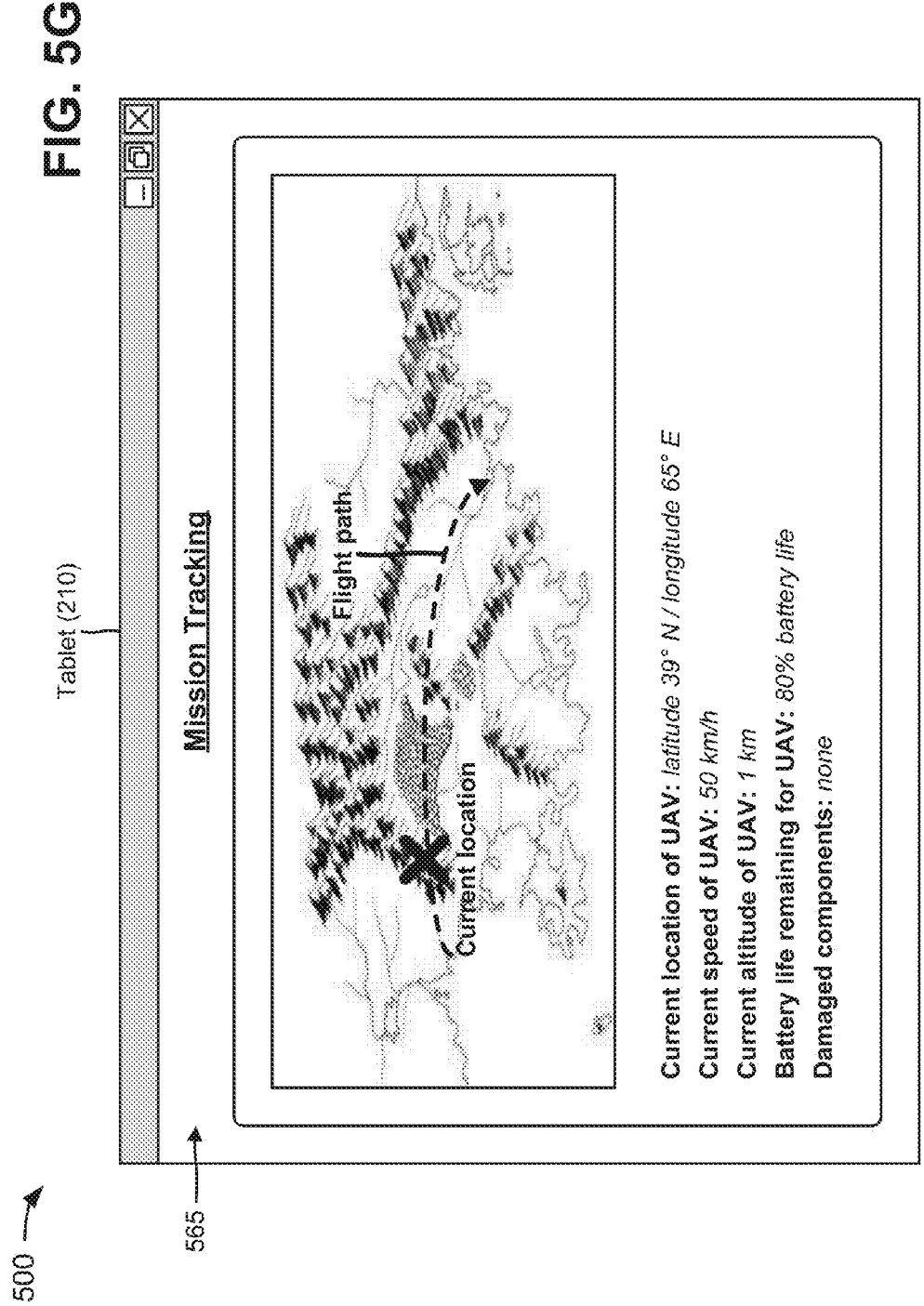

USER INTERFACES FOR SELECTING UNMANNED AERIAL VEHICLES AND MISSION PLANS FOR UNMANNED AERIAL VEHICLES

BACKGROUND

An unmanned aerial vehicle (UAV) is an aircraft without a human pilot aboard. A UAV's flight may be controlled either autonomously by onboard computers or by remote control of a pilot on the ground or in another vehicle. A UAV is typically launched and recovered via an automatic system or an external operator on the ground. There are a wide variety of UAV shapes, sizes, configurations, characteristics, etc. UAVs may be used for a growing number of applications, such as police surveillance, firefighting, security work (e.g., surveillance of pipelines), surveillance of farms, commercial purposes, etc.

BRIEF DESCRIPTION OF THE DRAWINGS

FIG. 2 is a diagram of an example environment in which systems and/or methods described herein may be implemented;

FIGS. 4A and 4B depict a flow chart of an example process for selecting a UAV, and a mission plan for the UAV, via user interfaces; and FIGS. 5A-5H are diagrams of an example relating to the example process shown in FIGS. 4A and 4B.

DETAILED DESCRIPTION OF PREFERRED EMBODIMENTS

The following detailed description refers to the accompanying drawings. The same reference numbers in different drawings may identify the same or similar elements.

Some private companies propose using UAVs for rapid delivery of lightweight commercial products (e.g., packages), food, medicine, etc. Such proposals for UAVs may need to meet various requirements, such as federal and state regulatory approval, public safety, reliability, individual privacy, operator training and certification, security (e.g., hacking), payload thievery, logistical challenges, etc.

Figure 1A:
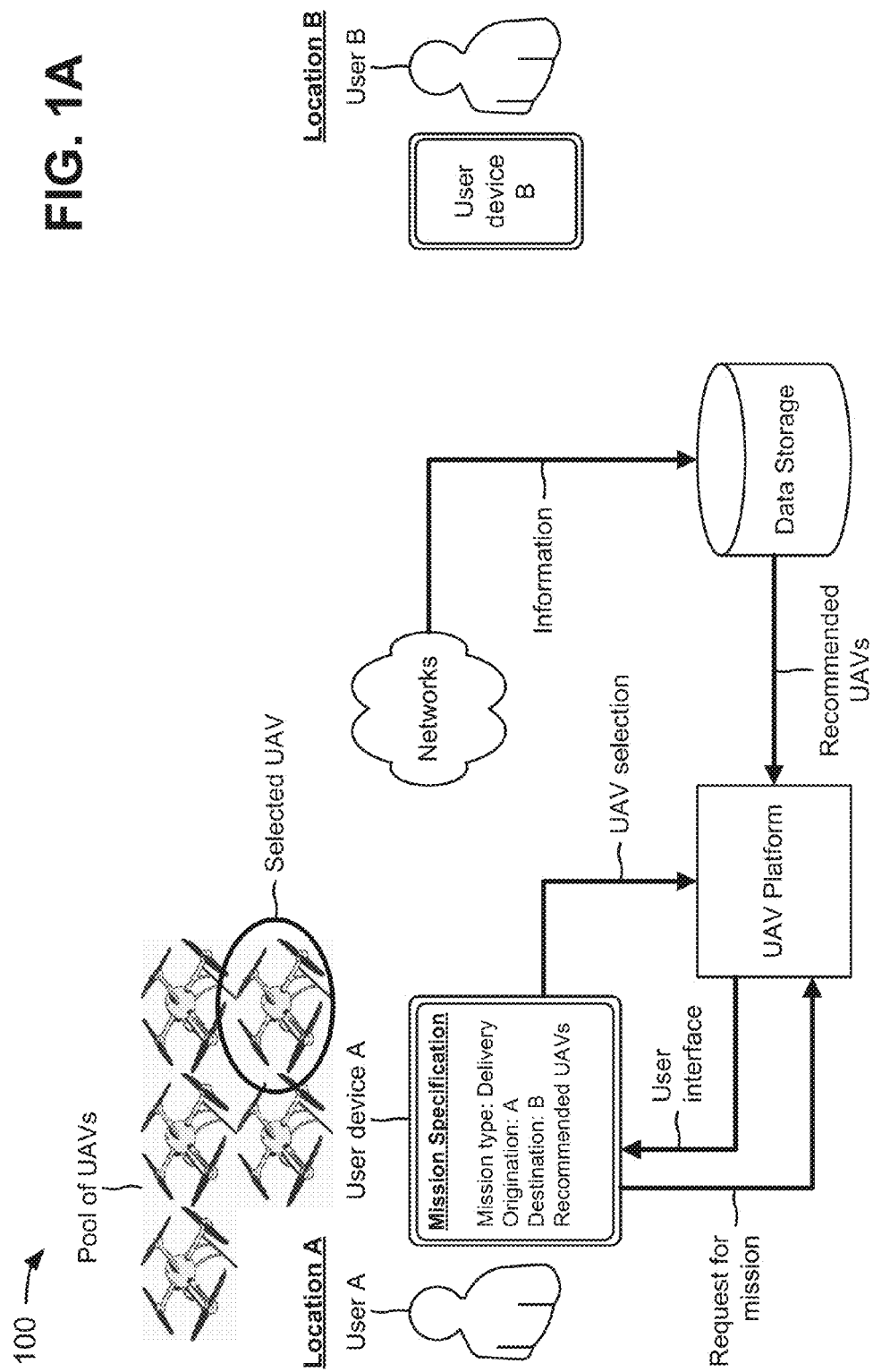
FIGS. 1A and 1B are diagrams of an overview of an example implementation described herein.
Figure 1B:
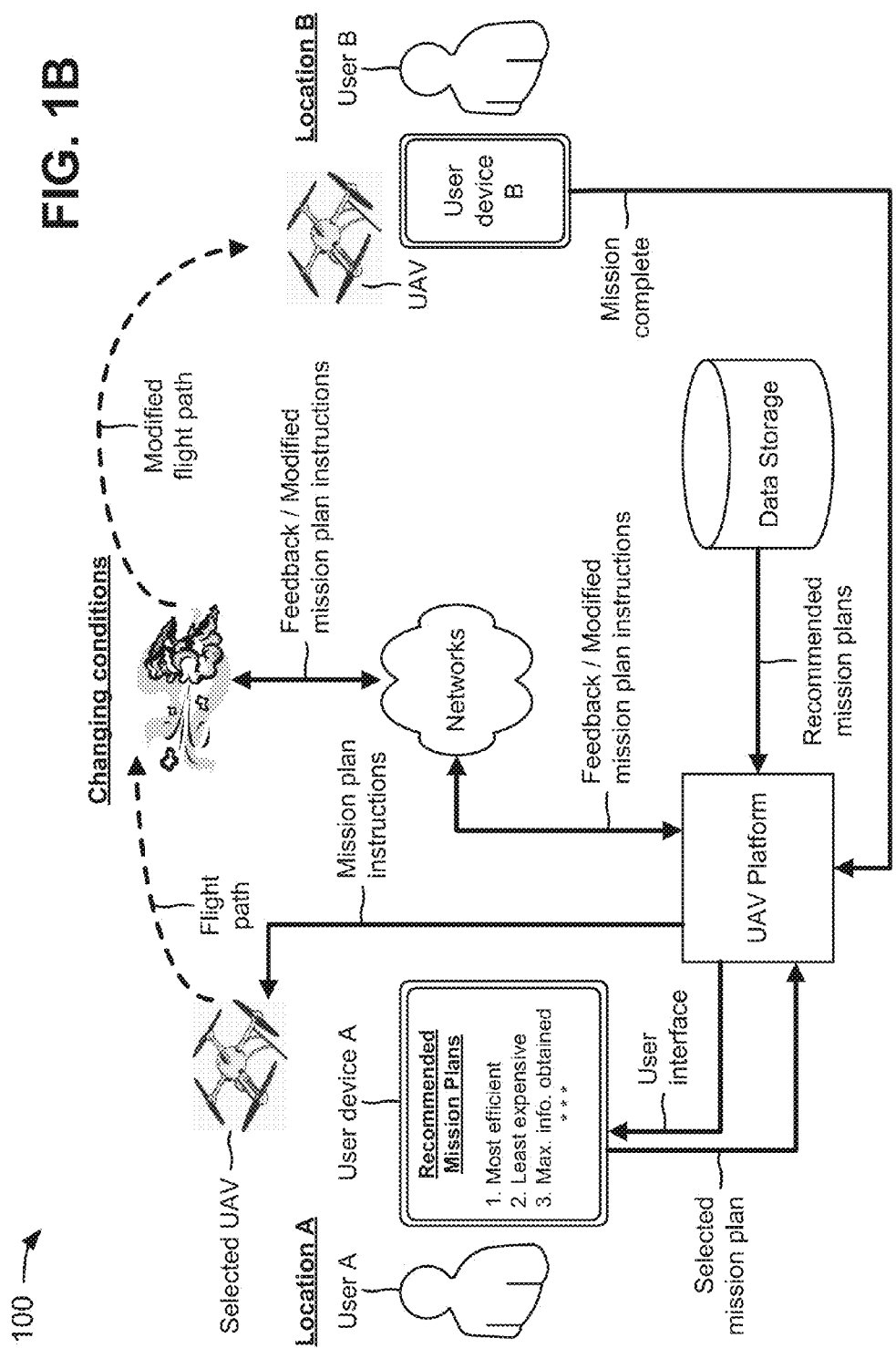

FIGS. 1A and 1B are diagrams of an overview of an example implementation 100 described herein. In example implementation 100, assume that a first user device (e.g., user device A) is associated with a first user (e.g., user A) that is located at an origination location (e.g., location A), as shown in FIG. 1A. Further, assume that user A wants to fly a UAV, selected from a pool or group of UAVs, from location A to a destination location (e.g., location B) in order to perform one or more mission operations, such as delivering a package to a second user (e.g., user B) associated with a second user device (e.g., user device B). As further shown in FIG. 1A, a UAV platform or system may be associated with data storage, and the UAV platform and the data storage may communicate with networks, such as a wireless network, a satellite network, and/or other networks. The networks may provide information to the data storage, such as capability information associated with the UAVs (e.g., thrusts, battery life, etc. associated with the UAVs); weather information associated with a geographical region that includes geographical locations of location A, location B, and locations between location A and location B; air traffic information associated with the geographical region; obstacle information (e.g., buildings, mountains, etc.) associated with the geographical region; regulatory information (e.g., no-fly zones, government buildings, etc.) associated with the geographical region; historical information (e.g., former flight paths, former weather, etc.) associated with the geographical region; etc.

As further shown in FIG. 1A, user A may instruct user device A to generate a request for a mission that includes traversal of a flight path (e.g., from location A to location B) and performance of mission operations (e.g., delivering the package) by a UAV in the pool of UAVs, and to provide the request to the UAV platform. The request may include credentials (e.g., serial numbers, identifiers of universal integrated circuit cards (UICCs), etc.) associated with the UAVs in the pool. The UAV platform may utilize the UAV credentials to determine whether the UAVs in the pool are authenticated for utilizing the UAV platform and/or one or more of the networks, and are registered with an appropriate authority (e.g., a government agency) for use. For example, the UAV platform may compare the UAV credentials with UAV account information (e.g., information associated with authenticated and registered UAVs) provided in the data storage to determine whether the UAVs in the pool are authenticated. In example implementation 100, assume that the UAVs in the pool are authenticated by the UAV platform.

The UAV platform may provide a mission specification user interface to user device A, and user device A may display the mission specification user interface to user A. User A may utilize user device A and the mission specification user interface to specify mission information, such as a mission type (e.g., delivery of package), the mission's origination location (e.g., location A), and the mission's destination location (e.g., location B). The UAV platform may determine recommended UAVs, from the pool of UAVs, for the mission based on the mission information, and may provide information associated with the recommended UAVs for presentation to user A via the mission specification user interface. User A may select one of the recommended UAVs, and the UAV platform may receive the selection of the recommended UAVs.

The UAV platform may determine recommended mission plans based on the mission information and the selected UAV, as shown in FIG. 1B. The UAV platform may generate a recommended mission plans user interface that includes information associated with the recommended mission plans, and may provide the recommended mission plans user interface to user device A (e.g., for display to user A). As further shown in FIG. 1B, the recommended mission plans user interface may include information associated with a most efficient (e.g., a shortest distance) mission plan, a least expensive mission plan, a mission plan that obtains a maximum amount of information, etc. User A may select one of the recommended mission plans, and the UAV platform may receive the selection of the recommended mission plan.

The UAV platform may generate mission plan instructions, for the selected mission plan, that include flight path instructions for the flight path (e.g., from location A to location B) and mission instructions for the mission operations. For example, the mission plan instructions may indicate that the selected UAV is to fly at an altitude of two-thousand (2,000) meters, for fifty (50) kilometers and fifty-five (55) minutes, and then is to fly at an altitude of one-thousand (1,000) meters, for seventy (70) kilometers and one (1) hour in order to arrive at location B and deliver the package to user B. As further shown in FIG. 1B, the UAV platform may provide the mission plan instructions to the selected UAV. The selected UAV may take off from location A, and may travel the flight path based on the flight path instructions.

While the selected UAV is traveling along the flight path, one or more of the networks may receive feedback from the selected UAV regarding the flight path (e.g., about changing conditions, such as speed, weather conditions, duration, etc.). Assume that the selected UAV senses changing weather conditions (e.g., a headwind) along the flight path, and provides information about the weather conditions to the UAV platform (e.g., via the feedback). The UAV platform and/or the selected UAV may calculate a modified mission plan that enables the selected UAV to compensate for the headwind, and may generate modified mission plan instructions for the modified mission plan. The UAV platform may provide the modified mission plan instructions to the selected UAV. The selected UAV may travel a modified flight path, based on the modified mission plan instructions. When the UAV arrives at location B, the UAV and/or user device B may generate a notification indicating that the selected UAV completed the mission (e.g., delivered the package), and may provide the notification to the UAV platform.

Systems and/or methods described herein may provide a platform that enables UAVs to safely traverse flight paths from origination locations to destination locations. The systems and/or methods may provide user interfaces that enable users of the platform to select the UAVs, manage the UAVs, and define missions for the UAVs, without the need for line of sight control of the UAVs.

FIG. 2 is a diagram of an example environment 200 in which systems and/or methods described herein may be implemented. As illustrated, environment 200 may include user devices 210, UAVs 220, a UAV platform 230, data storage 235, a wireless network 240, a satellite network 250, and other networks 260. Devices/networks of environment 200 may interconnect via wired connections, wireless connections, or a combination of wired and wireless connections.

User device 210 may include a device that is capable of communicating over wireless network 240 with UAV 220, UAV platform 230, and/or data storage 235. In some implementations, user device 210 may include a radiotelephone; a personal communications services (PCS) terminal that may combine, for example, a cellular radiotelephone with data processing and data communications capabilities; a smart phone; a personal digital assistant (PDA) that can include a radiotelephone, a pager, Internet/intranet access, etc.; a laptop computer; a tablet computer; a global positioning system (GPS) device; a gaming device; or another type of computation and communication device.

UAV 220 may include an aircraft without a human pilot aboard, and may also be referred to as an unmanned aircraft (UA), a drone, a remotely piloted vehicle (RPV), a remotely piloted aircraft (RPA), or a remotely operated aircraft (ROA). In some implementations, UAV 220 may include a variety of shapes, sizes, configurations, characteristics, etc. for a variety of purposes and applications. In some implementations, UAV 220 may include one or more sensors, such as electromagnetic spectrum sensors (e.g., visual spectrum, infrared, or near infrared cameras, radar systems, etc.); biological sensors; chemical sensors; etc. In some implementations, UAV 220 may utilize one or more of the aforementioned sensors to sense (or detect) and avoid an obstacle in or near a flight path of UAV 220.

In some implementations, UAV 220 may include a particular degree of autonomy based on computational resources provided in UAV 220. For example, UAV 220 may include a low degree of autonomy when UAV 220 has few computational resources. In another example, UAV 220 may include a high degree of autonomy when UAV 220 has more computational resources (e.g., built-in control and/or guidance systems to perform low-level human pilot duties, such as speed and flight-path stabilization, scripted navigation functions, waypoint following, etc.). The computational resources of UAV 220 may combine information from different sensors to detect obstacles on the ground or in the air; communicate with one or more of networks 240-260 and/or other UAVs 220; determine an optimal flight path for UAV 220 based on constraints, such as obstacles or fuel requirements; determine an optimal control maneuver in order to follow a given path or go from one location to another location; regulate a trajectory of UAV 220; etc. In some implementations, UAV 220 may include a variety of components, such as a power source (e.g., an internal combustion engine, an electric battery, a solar-powered battery, etc.); a component that generates aerodynamic lift force (e.g., a rotor, a propeller, a rocket engine, a jet engine, etc.); computational resources; sensors; etc.

UAV platform 230 may include one or more personal computers, one or more workstation computers, one or more server devices, one or more virtual machines (VMs) provided in a cloud computing network, or one or more other types of computation and communication devices. In some implementations, UAV platform 230 may be associated with a service provider that manages and/or operates wireless network 240, satellite network 250, and/or other networks 260, such as, for example, a telecommunication service provider, a television service provider, an Internet service provider, etc.

In some implementations, UAV platform 230 may receive, from user device 210, a request for a mission that includes traversal of a flight path from an origination location to a destination location and performance of one or more mission operations. UAV platform 230 may provide, for display, a first user interface that requests mission information, and may receive mission information via the first user interface. UAV platform 230 may determine recommended UAVs 220 for the mission based on the mission information, and may provide, for display, information associated the recommended UAVs 220 via the first user interface. UAV platform 230 may receive selection of a UAV 220, from the recommended UAVs 220, via the first user interface, and may determine recommended mission plans based on the mission information and the selected UAV 220. UAV platform 230 may provide, for display, information associated the recommended mission plans via a second user interface, and may receive selection of a mission plan, from the recommended mission plans, via the second user interface. UAV platform 230 may generate mission plan instructions for the selected mission plan, and may provide the mission plan instructions to the selected UAV 220. UAV platform 230 may receive feedback from the selected UAV 220 during performance of the mission plan instructions. UAV platform 230 may provide, for display, the feedback via a third user interface, and may provide, for display, a notification indicating that the selected UAV 220 completed the mission via a fourth user interface.

In some implementations, UAV platform 230 may authenticate one or more users, associated with user device 210 and/or UAV 220, for utilizing UAV platform 230, and may securely store authentication information associated with the one or more users. In some implementations, UAV platform 230 may adhere to requirements to ensure that UAVs 220 safely traverse flight paths, and may limit the flight paths of UAVs 220 to particular safe zones (e.g., particular altitudes, particular geographical locations, particular geo-fencing, etc.) to further ensure safety.

Data storage 235 may include one or more storage devices that store information in one or more data structures, such as databases, tables, lists, trees, etc. In some implementations, data storage 235 may store information, such as UAV account information (e.g., serial numbers, model numbers, user names, etc. associated with UAVs 220); capability information associated with UAVs 220 (e.g., thrust, battery life, etc. associated with UAVs 220); weather information associated with a geographical region (e.g., precipitation amounts, wind conditions, etc.); air traffic information associated with the geographical region (e.g., commercial air traffic, other UAVs 220, etc.); obstacle information (e.g., buildings, mountains, towers etc.) associated with the geographical region; regulatory information (e.g., no fly zones, government buildings, etc.) associated with the geographical region; historical information (e.g., former flight paths, former weather conditions, etc.) associated with the geographical region; etc. In some implementations, data storage 235 may be included within UAV platform 230.

Wireless network 240 may include a fourth generation (4G) cellular network that includes an evolved packet system (EPS). The EPS may include a radio access network (e.g., referred to as a long term evolution (LTE) network), a wireless core network (e.g., referred to as an evolved packet core (EPC) network), an Internet protocol (IP) multimedia subsystem (IMS) network, and a packet data network (PDN). The LTE network may be referred to as an evolved universal terrestrial radio access network (E-UTRAN), and may include one or more base stations (e.g., cell towers). The EPC network may include an all-Internet protocol (IP) packet-switched core network that supports high-speed wireless and wireline broadband access technologies. The EPC network may allow user devices 210 and/or UAVs 220 to access various services by connecting to the LTE network, an evolved high rate packet data (eHRPD) radio access network (RAN), and/or a wireless local area network (WLAN) RAN. The IMS network may include an architectural framework or network (e.g., a telecommunications network) for delivering IP multimedia services. The PDN may include a communications network that is based on packet switching. In some implementations, wireless network 240 may provide location information (e.g., latitude and longitude coordinates) associated with user devices 210 and/or UAVs 220. For example, wireless network 240 may determine a location of user device 210 and/or UAV 220 based on triangulation of signals, generated by user device 210 and/or UAV 220 and received by multiple cell towers, with prior knowledge of the cell tower locations.

Satellite network 250 may include a space-based satellite navigation system (e.g., a global positioning system (GPS)) that provides location and/or time information in all weather conditions, anywhere on or near the Earth where there is an unobstructed line of sight to four or more satellites (e.g., GPS satellites). In some implementations, satellite network 250 may provide location information (e.g., GPS coordinates) associated with user devices 210 and/or UAVs 220, enable communication with user devices 210 and/or UAVs 220, etc.

Each of other networks 260 may include a network, such as a local area network (LAN), a wide area network (WAN), a metropolitan area network (MAN), a telephone network, such as the Public Switched Telephone Network (PSTN) or a cellular network, an intranet, the Internet, a fiber optic network, a cloud computing network, or a combination of networks.

The number of devices and/or networks shown in FIG. 2 is provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, one or more of the devices of environment 200 may perform one or more functions described as being performed by another one or more devices of environment 200.

Figure 3:
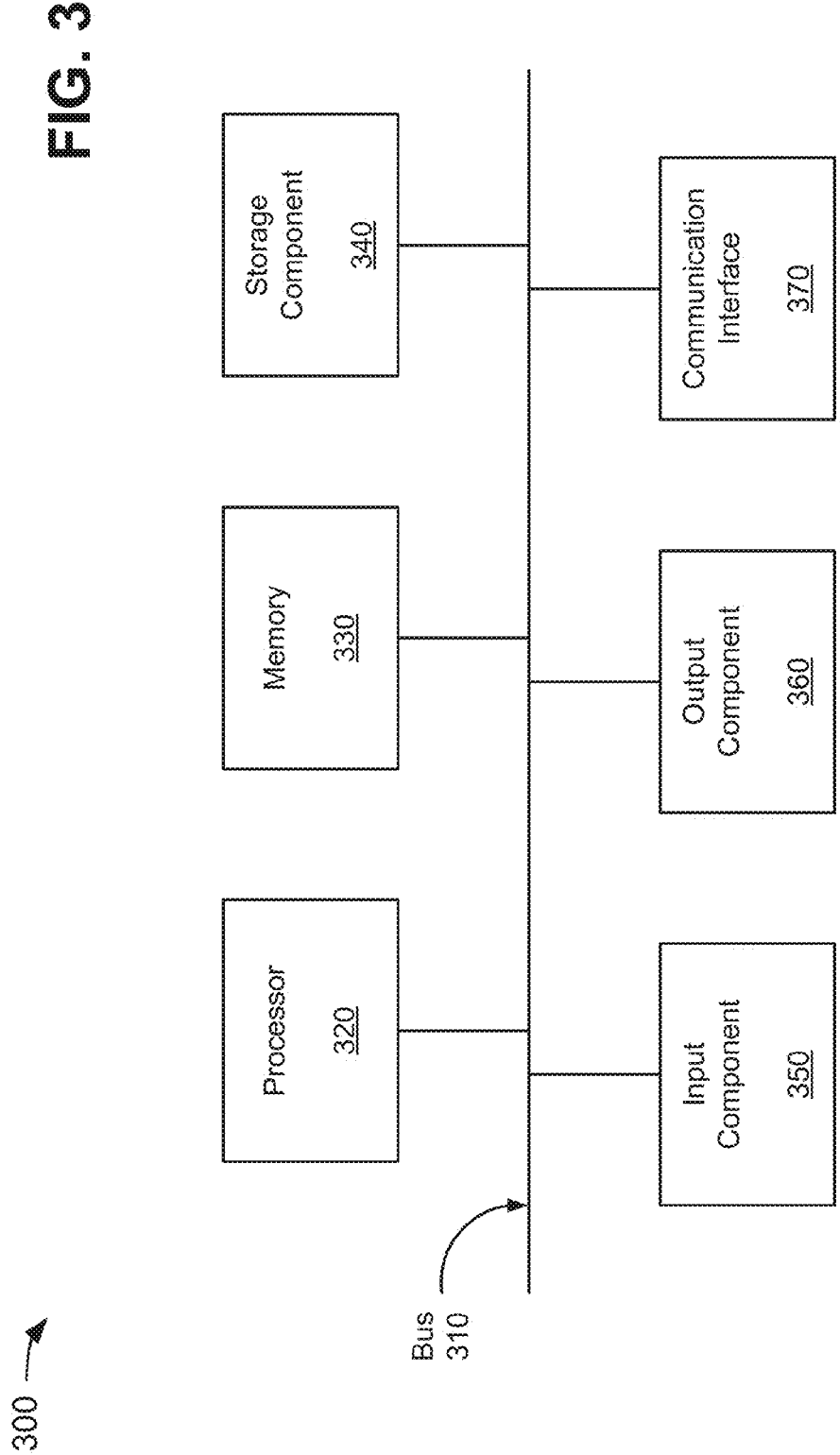
FIG. 3 is a diagram of example components of one or more devices of FIG. 2.

FIG. 3 is a diagram of example components of a device 300 that may correspond to one or more of the devices of environment 200. In some implementations, one or more of the devices of environment 200 may include one or more devices 300 or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), etc.) that interprets and/or executes instructions. Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 is provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A and 4B depict a flow chart of an example process 400 for selecting a UAV, and a mission plan for the UAV, via user interfaces. In some implementations, one or more process blocks of FIGS. 4A and 4B may be performed by UAV platform 230. In some implementations, one or more process blocks of FIGS. 4A and 4B may be performed by another device or a group of devices separate from or including UAV platform 230, such as user device 210 and/or UAV 220.

As shown in FIG. 4A, process 400 may include receiving a request for a mission that includes traversal of a flight path from a first location to a second location and performance of one or more mission operations (block 405). For example, UAV platform 230 may receive, from user device 210, a request for a mission that includes traversal of a flight path from a first location to a second location in a particular region. In some implementations, the request for the mission may include a request for flight path instructions from an origination location (e.g., a current location of a pool of UAVs 220) to a destination location (e.g., a location in the particular region). The origination location and the destination location may be provided in the particular region. In some implementations, the pool of UAVs 220 may be associated with UAV platform 230 and/or user(s) associated with user device 210. For example, user device 210 and the pool of UAVs 220 may be owned and/or operated by an emergency service provider (e.g., a fire station, a police station, a hazardous materials handler, etc.), a delivery company, a telecommunication service provider, a television service provider, an Internet service provider, etc.

In some implementations, the request for the mission may include information requesting performance of one or more mission operations along the flight path and/or at the destination location. For example, the mission operations may include monitoring a nuclear reactor that is experiencing a meltdown and is leaking radiation. Such a request may include information requesting UAVs 220 to capture video of the nuclear reactor, capture images of the nuclear reactor, detect temperature levels at the nuclear reactor, detect radiation levels at the nuclear reactor, etc. In another example, the mission operations may include monitoring a forest fire. Such a request may include information requesting UAVs 220 to capture video of the forest fire, capture images of the forest fire, detect temperatures at different locations of the forest fire, detect wind conditions at the forest fire, etc. In some implementations, the mission operations may include monitoring a hostile location (e.g., a hostage location of a terrorist compound, a plane hijacking, etc.); a location of an accident (e.g., a building fire, a warehouse explosion, etc.); a location of a natural disaster (e.g., a tornado, a hurricane, a tsunami, an earthquake, etc.); etc.

As further shown in FIG. 4A, process 400 may include providing, for display, a first user interface that requests mission information (block 410). For example, UAV platform 230 may provide, for display, a first user interface that requests mission information, based on the request for the mission. In some implementations, UAV platform 230 may display the first user interface to a user of UAV platform 230, and/or may provide the first user interface to user device 210 (e.g., and user device 210 may display the first user interface to a user of user device 210). In some implementations, the first user interface may request mission information, such as a type of mission (e.g., a rescue mission, a delivery mission, an emergency mission, a measurement mission, a surveillance mission, etc.); a location of the mission (e.g., the origination location, the destination location, the region, locations of the pool of UAVs 220, etc.); and/or constraints associated with the mission (e.g., cost constraints, time constraints, etc.).

As further shown in FIG. 4A, process 400 may include receiving the mission information via the first user interface (block 415). For example, the user of user device 210 may input the mission information requested by the first user interface, and may instruct user device 210 to provide the mission information to UAV platform 230. UAV platform 230 may receive the mission information from user device 210. In some implementations, the user of UAV platform 230 may input the mission information requested by the first user interface, and UAV platform 230 may receive the mission information.

As further shown in FIG. 4A, process 400 may include determining recommended UAVs for the mission based on the mission information (block 420). For example, UAV platform 230 may determine recommended UAVs for traversing the flight path and performing the one or more mission operations, based on the mission information. In some implementations, UAV platform 230 may determine the recommended UAVs based on the origination location, the destination location, and/or the particular region associated with the flight path and/or the mission operations. For example, UAV platform 230 may determine that the flight path and/or the mission operations require UAVs 220 to be available and located at or near the destination location, able to travel non-stop to the destination location (e.g., located twenty kilometers from the origination location), able to travel in the particular region, etc. In such an example, UAV platform 230 may not recommend UAVs 220 capable of flying ten kilometers non-stop (e.g., since the destination location is located twenty kilometers from the origination location), but may recommend UAVs 220 capable of flying thirty kilometers non-stop.

Additionally, or alternatively, UAV platform 230 may determine the recommended UAVs 220 based on physical requirements (e.g., payload capacity, battery life, non-stop flying distance, etc. associated with UAVs 220) associated with the flight path and/or the mission operations. For example, UAV platform 230 may determine that the flight path and/or the mission operations require UAVs 220 that are capable of carrying a payload that weighs ten kilograms for a distance of twenty kilometers non-stop. In such an example, UAV platform 230 may not recommend UAVs 220 capable of carrying payloads that weigh less than five kilograms for a distance of ten kilometers non-stop. However, UAV platform 230 may recommend UAVs 220 capable of carrying payloads that weigh twenty kilograms for a distance of thirty kilometers non-stop.

Additionally, or alternatively, UAV platform 230 may determine the recommended UAVs 220 based on component requirements (e.g., sensors, network generating components, etc. of UAVs 220) associated with the flight path and/or the mission operations. For example, UAV platform 230 may determine that the flight path and/or the mission operations require UAVs 220 that are capable of recording video images. In such an example, UAV platform 230 may not recommend UAVs 220 without a video camera, but may recommend UAVs 220 with a video camera. In another example, UAV platform 230 may determine that the flight path and/or the mission operations require UAVs 220 that are capable of sensing radiation along the flight path. In such an example, UAV platform 230 may not recommend UAVs 220 without a radiation sensor, but may recommend UAVs 220 with a radiation sensor.

Additionally, or alternatively, UAV platform 230 may determine the recommended UAVs 220 based on the aviation information associated with the particular region, such as the weather information, the air traffic information, the obstacle information, the regulatory information, the historical information, etc. associated with the particular region. For example, assume that the weather information indicates that the flight path requires traveling through a particular headwind of twenty kilometers per hour. In such an example, UAV platform 230 may determine that the flight path requires UAVs 220 that are capable of withstanding the particular headwind. In another example, assume that the air traffic information indicates that the flight path requires traveling at a particular altitude of one kilometer to avoid other air traffic. In such an example, UAV platform 230 may determine that the flight path requires UAVs 220 that are capable of traveling at the particular altitude.

Additionally, or alternatively, UAV platform 230 may determine the recommended UAVs 220 based on availability of UAVs 220 in a pool of UAVs 220. For example, assume that UAV platform 230 is associated with a pool of ten UAVs 220, and that two UAVs 220 in the pool are currently being used for other missions and are unavailable. In such an example, UAV platform 230 may not recommend the two UAVs 220 since the two UAVs 220 are unavailable, but may recommend the remaining eight UAVs 220 in the pool that are available.

Additionally, or alternatively, UAV platform 230 may determine the recommended UAVs 220 based on operational states of UAVs 220 in the pool of UAVs 220. For example, assume that three UAVs 220 in the pool have low batteries and need to be charged, and that the mission requires UAVs 220 that may be used immediately. In such an example, UAV platform 230 may not recommend the three UAVs 220 for the mission since the three UAVs 220 may not be used immediately due to their low batteries (e.g., the three UAVs 220 may need to be charged). In another example, assume that a particular UAV 220 in the pool needs to undergo maintenance before being utilized, and that the mission requires UAVs 220 that may be used immediately. In such an example, UAV platform 230 may not recommend the particular UAV 220 for the mission since the particular UAV 220 may not be used immediately due to required maintenance.

Additionally, or alternatively, UAV platform 230 may determine the recommended UAVs 220 based on costs associated with operating UAVs 220 in the pool of UAVs 220. For example, assume that two UAVs 220 in the pool require expensive fuel to operate, and that the mission requires UAVs 220 that are the least expensive to operate. In such an example, UAV platform 230 may not recommend the two UAVs 220 for the mission since the two UAVs 220 are too expensive to operate due to the expensive fuel costs. In another example, assume that a particular UAV 220 in the pool includes a high quality camera that requires a lot of battery power (e.g., such that the particular UAV 220 may only fly for one hour), and that the mission requires UAVs 220 with sufficient battery power to fly for three hours. In such an example, UAV platform 230 may not recommend the particular UAV 220 for the mission since the particular UAV 220 may only fly for one hour.

Additionally, or alternatively, UAV platform 230 may determine the recommended UAVs 220 based on a time limit for the mission. For example, assume that two UAVs 220 in the pool are slow and would take three hours to complete the mission, and that the mission requires UAVs 220 that can complete the mission in two hours. In such an example, UAV platform 230 may not recommend the two UAVs 220 for the mission since the two UAVs 220 cannot complete the mission in the required two hours. In another example, assume that a particular UAV 220 in the pool is able to leave the origination location immediately, and that the mission requires UAVs 220 that can leave the origination location immediately. In such an example, UAV platform 230 may recommend the particular UAV 220 for the mission since the particular UAV 220 can leave the origination location immediately.

Additionally, or alternatively, UAV platform 230 may determine the recommended UAVs 220 based on a type of mission. For example, assume that three UAVs 220 in the pool can withstand temperatures greater than three-hundred degrees Celsius, and that the mission requires UAVs 220 that can monitor a fire at a temperature of two-hundred degrees Celsius. In such an example, UAV platform 230 may recommend the three UAVs 220 for the mission since the three UAVs 220 can withstand the fire temperature of two-hundred degrees Celsius. In another example, assume that a particular UAV 220 in the pool includes a radiation sensor, and that the mission requires UAVs 220 that can monitor radiation of a nuclear reactor. In such an example, UAV platform 230 may recommend the particular UAV 220 for the mission since the particular UAV 220 can monitor the radiation of the nuclear reactor.

In some implementations, UAV platform 230 may recommend UAVs 220, from UAVs 220 in the pool, when the recommended UAVs 220 are capable of performing the mission operations, and flying a distance associated with the flight path, in weather conditions (e.g., specified by the weather information), without colliding with air traffic and/or obstacles (e.g., specified by the air traffic information and the obstacle information), and without violating any regulations (e.g., specified by the regulatory information). In some implementations, UAV platform 230 may recommend multiple UAVs 220, from UAVs 220 in the pool, and may select, as the recommended UAVs 220, ones of the multiple UAVs 220 that are capable of traversing the flight path and performing the mission operations.

In some implementations, UAV platform 230 may retrieve, from data storage 235, capability information for UAVs 220 in the pool. In some implementations, data storage 235 may include capability information associated with different components of UAVs 220, such as battery life, thrusts provided by rotors, flight times associated with amounts of fuel, etc. In some implementations, UAV platform 230 may utilize component information of UAVs 220 in the pool (e.g., indicating that UAVs 220 in the pool have particular types of batteries, engines, rotors, sensors, etc.) to retrieve the capability information for components of UAVs 220 in the pool from data storage 235. For example, if a particular UAV 220 in the pool has a particular type of battery and a particular type of rotor, UAV platform 230 may determine that the particular type of battery of the particular UAV 220 may provide two hours of flight time and that the particular type of rotor may enable the particular UAV 220 to reach an altitude of one-thousand meters.

In some implementations, UAV platform 230 may assign different weights to different capability information associated with UAVs 220 in the pool. In some implementations, UAV platform 230 may calculate a score for each of UAVs 220 in the pool based on the capability information and the assigned weights. For example, assume that UAV platform 230 assigns a weight of 0.1 to battery lives of UAVs 220 in the pool, a weight of 0.2 to rotor thrusts of UAVs 220 in the pool, and a weight of 0.5 to the sense and avoid capabilities of UAVs 220 in the pool. Further, assume that UAV platform 230 calculates a score of 0.4 for a first UAV 220 in the pool, a score of 0.7 for a second UAV 220 in the pool, and a score of 0.5 for a third UAV 220 in the pool. In some implementations, UAV platform 230 may recommend UAVs 220 in the pool based on the calculated scores. For example, UAV platform 220 may recommend UAVs 220 in the pool with the greatest scores or the smallest scores.

As further shown in FIG. 4A, process 400 may include providing, for display, information associated with the recommended UAVs, via the first user interface (block 425). For example, UAV platform 230 may provide, for display, information associated with the recommended UAVs 220 via the first user interface. In some implementations, UAV platform 230 may display the information associated with the recommended UAVs 220 to the user of UAV platform 230, and/or may provide the information associated with the recommended UAVs 220 to user device 210 (e.g., and user device 210 may display the information associated with the recommended UAVs 220 to the user of user device 210). In some implementations, the information associated with the recommended UAVs 220 may include capability information (e.g., battery life, thrusts provided by rotors, flight times associated with amounts of fuel, etc.); identification information (e.g., model numbers, serial numbers, etc.); component information (e.g., battery types, rotor types, sensors, engine types, etc.); cost information (e.g., costs based on types of UAVs 220, capabilities of UAVs 220, etc.); etc. associated with the recommended UAVs 220.

As further shown in FIG. 4A, process 400 may include receiving a selection of a UAV, from the recommended UAVs, via the first user interface (block 430). For example, the user of user device 210 may select a particular UAV 220, from the recommended UAVs 220, to utilize for performance of the mission. The user of user device 210 may instruct user device 210 to provide the selection of the particular UAV 220 to UAV platform 230, and UAV platform 230 may receive the selection of the particular UAV 220 from user device 210. In some implementations, the user of UAV platform 230 may select the particular UAV 220, via the first user interface, and UAV platform 230 may receive the selection of the particular UAV 220. In some implementations, one or more of the recommended UAVs 220 may be selected (e.g., via the first user interface) for performance of the mission, depending on the type of mission. For example, a package delivery may be performed by a single UAV 220, whereas surveillance of a forest fire may be performed by multiple UAVs 220.

As further shown in FIG. 4A, process 400 may include determining recommended mission plans based on the mission information and/or the selected UAV (block 435). For example, UAV platform 230 may determine one or more recommended mission plans based on the mission information and/or the selected UAV 220. In some implementations, the recommended mission plans may include flight paths from the origination location to the destination location and mission operations for the selected UAV 220 to perform for the mission. In some implementations, UAV platform 230 may determine the recommended mission plans based on capabilities of the selected UAV 220 and mission operation factors, such as, for example, hovering capabilities, sensing capabilities, maneuvering capabilities, protection capabilities (e.g., from temperature, radiation, fire, radar, etc.), etc. In some implementations, the recommended mission plans may include flight paths from other locations to the destination location. In some implementations, UAVs 220 in the pool may be located at the origination location. In some implementations, one or more of UAVs 220 in the pool may be located at the origination location, and one or more of UAVs 220 in the pool may be located at other locations (e.g., near the destination location). For example, a recommended mission plan may include delivery of a package from the origination location to the destination location. In another example, a recommended mission plan may include a surveillance mission that could use UAVs 220 from other locations (e.g., as long as utilization of such UAVs 220 is cost effective).

Additionally, or alternatively, UAV platform 230 may determine the recommended mission plans based on the time it takes to travel from the origination location to the destination location and the time it takes to complete the mission operations. For example, assume that, based on the aviation information (e.g., the weather information, the air traffic information, the obstacle information, the regulatory information, and/or the historical information), UAV platform 230 calculates three flight paths for the selected UAV 220 (e.g., which include performance of the mission operations) that include flight times of two hours, three hours, and five hours, respectively. In such an example, UAV platform 230 may recommend all three fight paths, or the flight path with the flight time of two hours (e.g., since the flight path requires the shortest amount of flight time).

Additionally, or alternatively, UAV platform 230 may determine the recommended mission plans based on the distance required to travel from the origination location to the destination location and the distance required to complete the mission operations. For example, assume that, based on the aviation information (e.g., the weather information, the air traffic information, the obstacle information, the regulatory information, and/or the historical information), UAV platform 230 calculates four flight paths for the selected UAV 220 (e.g., which include performance of the mission operations) that include distances of fifty kilometers, twenty kilometers, thirty kilometers, and sixty kilometers, respectively. In such an example, UAV platform 230 may recommend all four flight paths or the flight path with the distance of twenty kilometers (e.g., since the flight path requires the shortest distance).

Additionally, or alternatively, UAV platform 230 may determine the recommended mission plans based on power required to travel from the origination location to the destination location and power required to complete the mission operations. For example, assume that, based on the aviation information (e.g., the weather information, the air traffic information, the obstacle information, the regulatory information, and/or the historical information), UAV platform 230 calculates three flight paths for the selected UAV 220 (e.g., which include performance of the mission operations) that include power requirements of two hours of battery life, three hours of battery life, and one hour of battery life, respectively. In such an example, UAV platform 230 may recommend all three flight paths or the flight path with the power requirement of one hour of battery life (e.g., since the flight path requires the smallest amount of battery life).

Additionally, or alternatively, UAV platform 230 may determine the recommended mission plans based on costs associated with the mission plans. For example, assume that, based on the aviation information (e.g., the weather information, the air traffic information, the obstacle information, the regulatory information, and/or the historical information), UAV platform 230 calculates three flight paths for the selected UAV 220 (e.g., which include performance of the mission operations) that include example costs of $1,000, $4,000, and $2,000, respectively. In such an example, UAV platform 230 may recommend all three flight paths or the least expensive flight path (e.g., the flight path that costs $1,000).

Additionally, or alternatively, UAV platform 230 may determine the recommended mission plans based on information obtained by the mission plans. For example, assume that, based on the aviation information (e.g., the weather information, the air traffic information, the obstacle information, the regulatory information, and/or the historical information) and capabilities of the selected UAV 220, UAV platform 230 calculates three flight paths for the selected UAV 220 (e.g., which include performance of the mission operations) that include obtaining video information, obtaining video and temperature information, and obtaining radiation information, respectively. In such an example, UAV platform 230 may recommend all three flight paths or the flight path that obtains the video and temperature information (e.g., since the flight path obtains the maximum amount of information).

Additionally, or alternatively, UAV platform 230 may determine the recommended mission plans based on the aviation information, such as the weather information, the air traffic information, the obstacle information, the regulatory information, and/or the historical information stored in UAV platform 230 and/or data storage 235. In some implementations, UAV platform 230 may determine whether the aviation information indicates that the selected UAV 220 may safely complete a mission plan without stopping. If UAV platform 230 determines that the selected UAV 220 cannot safely complete a mission plan without stopping (e.g., to recharge or refuel), UAV platform 230 may determine one or more waypoints along the flight path for stopping and recharging or refueling.

Additionally, or alternatively, UAV platform 230 may determine the recommended mission plans based on the weather information. For example, UAV platform 230 may determine that, without weather issues, a mission plan may take the selected UAV 220 two hours to complete at an altitude of five-hundred meters. UAV platform 230 may further determine that wind conditions at five-hundred meters may create a headwind of fifty kilometers per hour on the selected UAV 220, but that wind conditions at one-thousand meters may create a tailwind of fifty kilometers per hour on the selected UAV 220. In such an example, UAV platform 230 may recommend a mission plan with an altitude of one-thousand meters (e.g., if the selected UAV 220 is capable of reaching the altitude of one-thousand meters).

Additionally, or alternatively, UAV platform 230 may determine the recommended mission plans based on the air traffic information. For example, UAV platform 230 may determine that, without air traffic issues, a mission plan may take the selected UAV 220 two hours to complete at an altitude of five-hundred meters. UAV platform 230 may further determine that other UAVs 220 are flying at the altitude of five-hundred meters based on the air traffic information, but that no other UAVs 220 are flying at an altitude of one-thousand meters. In such an example, UAV platform 230 may recommend a mission plan with an altitude of one-thousand meters. The altitude of one-thousand meters may enable the selected UAV 220 to safely arrive at the destination location without the possibility of colliding with the other UAVs 220.

Additionally, or alternatively, UAV platform 230 may determine the recommended mission plans based on the obstacle information. For example, UAV platform 230 may determine that, without obstacle issues, a mission plan may take the selected UAV 220 one hour to complete at an altitude of two-hundred meters. UAV platform 230 may further determine that one or more buildings are two-hundred meters in height based on the obstacle information, but that no other obstacles are greater than two-hundred meters in height. In such an example, UAV platform 230 may recommend a mission plan with an altitude of three-hundred meters. The altitude of three-hundred meters may enable the selected UAV 220 to safely arrive at the destination location without the possibility of colliding with the one or more buildings.

Additionally, or alternatively, UAV platform 230 may determine the recommended mission plans based on the regulatory information. For example, UAV platform 230 may determine that, without regulatory issues, a mission plan may take the selected UAV 220 one hour to complete at an altitude of five-hundred meters. UAV platform 230 may further determine that the mission plan travels over a restricted facility based on the regulatory information. In such an example, UAV platform 230 may recommend a mission plan to avoid flying over the restricted facility, which may increase the flight time from one hour to one hour and thirty minutes.

Additionally, or alternatively, UAV platform 230 may determine the recommended mission plans based on the historical information. For example, UAV platform 230 may identify prior mission plans from the historical information, and may select one of the prior mission plans, as the recommended mission plans. For example, assume that UAV platform 230 identifies three prior mission plans that include flight times of two hours, three hours, and four hours, respectively. In such an example, UAV platform 230 may recommend the prior mission plan with the flight time of two hours.

In some implementations, UAV platform 230 may assign weights (e.g., values, percentages, etc.) to different factors (e.g., of the mission information) to be used to determine the recommended mission plans, such as the travel time, the travel distance, the power needed, the weather information, the air traffic information, the obstacle information, the regulatory information, the historical information, costs of operating the selected UAV 220, capabilities of the selected UAV 220 (e.g., sensing capabilities, hovering capabilities, etc.), etc. UAV platform 230 may determine multiple mission plans based on the factors and the assigned weights. In some implementations, UAV platform 230 may calculate a score for each of the mission plans based on the factors and the assigned weights, and may select the recommended mission plans based on the calculated scores. For example, assume that UAV platform 230 assigns a weight of 0.3 to the travel time, a weight of 0.9 to the travel distance, a weight of 0.4 to the power needed, a weight of 0.1 to the weather information, a weight of 0.2 to the air traffic information, a weight of 0.5 to the obstacle information, a weight of 0.3 to the regulatory information, and a weight of 0.1 to the historical information. Further, assume that UAV platform 230 determines three mission plans (e.g., A, B, and C) based on the assigned weights, and calculates a score of 0.8 for mission plan A, a score of 0.6 for mission plan B, and a score of 0.7 for mission plan C. In such an example, UAV platform 230 may recommend mission plans A and C since mission plans A and C have the greatest scores.

As shown in FIG. 4B, process 400 may include providing, for display, information associated with the recommended mission plans, via a second user interface (block 440). For example, UAV platform 230 may provide, for display, information associated with the recommended mission plans via a second user interface. In some implementations, UAV platform 230 may display the information associated with the recommended mission plans to the user of UAV platform 230, and/or may provide the information associated with the recommended mission plans to user device 210 (e.g., and user device 210 may display the information associated with the recommended mission plans to the user of user device 210). In some implementations, the information associated with the recommended mission plans may include information associated with a most efficient mission plan (e.g., a shortest distance, a shortest time, etc.), a least expensive mission plan, a mission plan that obtains a maximum amount of information; maps depicting flight paths and mission operations for the mission plans; costs associated with the recommended mission plans; etc.

As further shown in FIG. 4B, process 400 may include receiving a selection of a mission plan, from the recommended mission plans, via the second user interface (block 445). For example, the user of user device 210 may select a particular mission plan, from the recommended mission plans, to utilize for performance of the mission. The user of user device 210 may instruct user device 210 to provide the selection of the particular mission plan to UAV platform 230, and UAV platform 230 may receive the selection of the particular mission plan from user device 210. In some implementations, the user of UAV platform 230 may select the particular mission plan, via the second user interface, and UAV platform 230 may receive the selection of the particular mission plan.

As further shown in FIG. 4B, process 400 may include generating mission plan instructions for the selected mission plan (block 450). For example, UAV platform 230 may generate mission plan instructions (e.g., for the selected mission plan) that include flight path instructions for the flight path and mission instructions for the mission operations. In some implementations, the flight path instructions may include specific altitudes for the selected UAV 220 between fixed geographic coordinates (e.g., a first location and a second location); navigational information (e.g., travel east for three kilometers, then north for two kilometers, etc.); expected weather conditions (e.g., headwinds, tailwinds, temperatures, etc.); network information (e.g., locations of base stations of wireless network 240); timing information (e.g., when to take off, when to perform certain navigational maneuvers, etc.); waypoint information (e.g., locations where the selected UAV 220 may stop and recharge or refuel); etc. For example, the flight path instructions may include information that instructs the selected UAV 220 to fly forty-five degrees northeast for ten kilometers and at an altitude of five-hundred meters, then fly three-hundred and fifteen degrees northwest for ten kilometers and at an altitude of four-hundred meters, etc.

In some implementations, the mission instructions may include information instructing the selected UAV 220 to perform certain mission operations along the flight path and/or at the destination location. For example, the mission instructions may include information instructing the selected UAV 220 to capture video and/or images, measure radiation levels at different locations, measure temperature levels at the different locations, etc. In another example, the mission instructions may include information instructing the selected UAV 220 to deliver a package (e.g., food, medicine, etc.) to a particular region (e.g., to survivors of a natural disaster than cannot be reached by emergency personnel).

As further shown in FIG. 4B, process 400 may include providing the mission plan instructions to the selected UAV (block 455). For example, UAV platform 230 may provide the mission plan instructions to the selected UAV 220. In some implementations, the selected UAV 220 may utilize the flight path instructions, of the mission plan instructions, to travel via the flight path. For example, the selected UAV 220 may take off at a time specified by the flight path instructions, may travel a route and at altitudes specified by the flight path instructions, may detect and avoid any obstacles encountered in the flight path, etc. until the selected UAV 220 arrives at the destination location. The selected UAV 220 may perform the mission operations at the destination location pursuant to the mission instructions of the mission plan instructions.

In some implementations, if the selected UAV 220 includes sufficient computational resources (e.g., a sufficient degree of autonomy), the selected UAV 220 may utilize information provided by the mission plan instructions to calculate a mission plan for the selected UAV 220 and to generate mission plan instructions. In such implementations, the mission plan instructions provided by UAV platform 230 may include less detailed information, and the selected UAV 220 may determine more detailed mission plan instructions via the computational resources of the selected UAV 220.

As further shown in FIG. 4B, process 400 may include receiving feedback from the selected UAV during performance of the mission plan instructions (block 460). For example, while the selected UAV 220 is traveling along the flight path in accordance with the flight path instructions and/or performing the mission operations, the selected UAV 220 may provide feedback to UAV platform 230 via one or more of networks 240-260, and UAV platform 230 may receive the feedback. In some implementations, the feedback may include information received by sensors of the selected UAV 220, such as visual information received from electromagnetic spectrum sensors of the selected UAV 220 (e.g., images of obstacles), temperature information, radiation levels, wind conditions; an operational state of the selected UAV 220 (e.g., battery life, rotor conditions, fuel level, etc.); flight information associated with the selected UAV 220 (e.g., a current altitude, a current speed, a current location, etc. of the selected UAV 220); etc. In some implementations, the selected UAV 220 may utilize such feedback to detect and avoid any unexpected obstacles encountered by the selected UAV 220 during traversal of the flight path. For example, if the selected UAV 220 detects another UAV 220 in the flight path, the selected UAV 220 may alter the flight path to avoid colliding with the other UAV 220.

As further shown in FIG. 4B, process 400 may include providing, for display, the feedback from the selected UAV, via a third user interface (block 465). For example, UAV platform 230 may provide, for display, the feedback received from the selected UAV 220, via a third user interface. In some implementations, UAV platform 230 may display the feedback to the user of UAV platform 230, and/or may provide the feedback to user device 210 (e.g., and user device 210 may display the feedback to the user of user device 210). In some implementations, the feedback may include the information described above, and may enable the user of user device 210 and/or the user of UAV platform 230 to track the performance of the mission by the selected UAV 220.

As further shown in FIG. 4B, process 400 may include providing, for display, a notification indicating that the mission is completed by the selected UAV, via a fourth user interface (block 470). For example, the selected UAV 220 may continue to perform the mission operations until the mission is complete. When the selected UAV 220 has completed the mission, the selected UAV 220 may provide a notification to UAV platform 230, via one or more of networks 240-260. In some implementations, the notification may indicate that the selected UAV 220 has completed the mission. UAV platform 230 may provide, for display, the notification received from the selected UAV 220, via a fourth user interface. In some implementations, UAV platform 230 may display the notification to the user of UAV platform 230, and/or may provide the notification to user device 210 (e.g., and user device 210 may display the notification to the user of user device 210).

Although FIGS. 4A and 4B shows example blocks of process 400, in some implementations, process 400 may include additional blocks, fewer blocks, different blocks, or differently arranged blocks than those depicted in FIGS. 4A and 4B. Additionally, or alternatively, two or more of the blocks of process 400 may be performed in parallel.

Figure 5B:
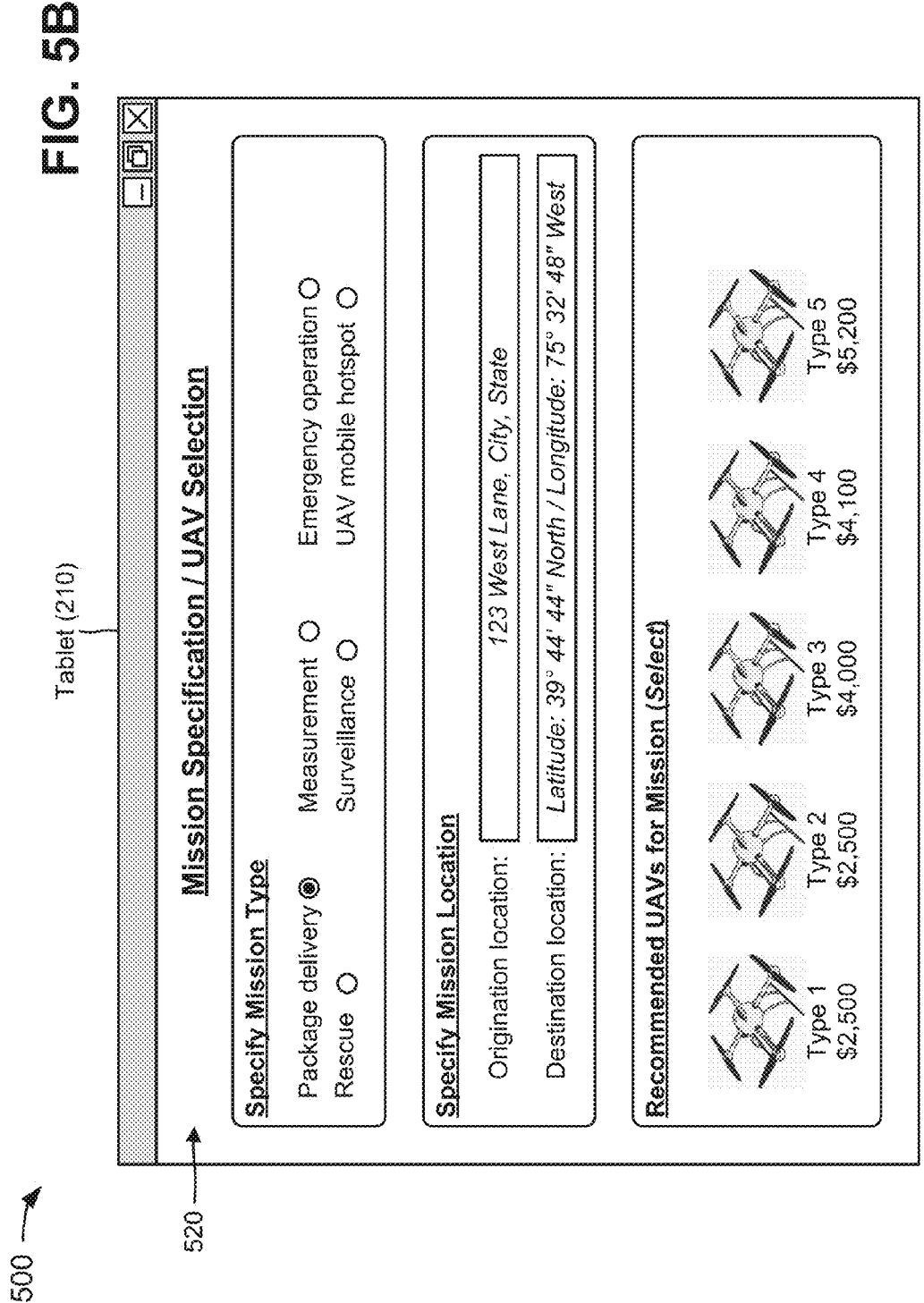

FIGS. 5A-5H are diagrams of an example 500 relating to example process 400 shown in FIGS. 4A and 4B. Assume that a first user device 210 (e.g., a tablet 210) is associated with a first user (e.g., an employee at a delivery company) that is located at an origination location (e.g., Washington, D.C.), as shown in FIG. 5A. Further, assume that a second user device 210 (e.g., a computer 210) is associated with a second user (e.g., Bob) that is located at a destination location (e.g., a hospital in Fairfax, Va.), and that Bob has instructed computer 210 to request delivery of a package to Fairfax, Va. For example, computer 210 may inform tablet 210 (e.g., via one or more servers associated with the delivery company) and the employee that the package is to be delivered to Bob as soon as possible. Further, assume that the employee wants to select a UAV 220, from a pool 505 of UAVs 220, to fly the package from Washington, D.C. to Fairfax, Va. in order to deliver the package to Bob.

As further shown in FIG. 5A, UAV platform 230 and data storage 235 may communicate with wireless network 240, satellite network 250, and/or other networks 260. One or more of networks 240-260 may provide, to data storage 235, information 510, such as capability information associated with UAVs 220 in pool 505, weather information associated with a geographical region (e.g., that includes a geographical location of Washington, D.C., a geographical location of Fairfax, Va., and geographical locations between Washington and Fairfax), air traffic information associated with the geographical region, obstacle information associated with the geographical region, regulatory information associated with the geographical region, historical information associated with the geographical region, etc.

As further shown in FIG. 5A, the employee may instruct tablet 210 to generate a request 515 for a mission (e.g., for a selected UAV 220 in pool 505) that includes travelling a flight path (e.g., from Washington, D.C. to Fairfax, Va.) and performing a mission (e.g., delivering a package to Bob) at Fairfax, Va. The employee may also instruct tablet 210 to provide request 515 to UAV platform 230. Request 515 may include credentials (e.g., serial numbers, identifiers of UICCs, etc.) associated with UAVs 220 in pool 505, or the credentials may be provided separately from request 515 to UAV platform 230. UAV platform 230 may utilize the credentials to determine whether one or more UAVs 220 in pool 505 are authenticated for utilizing UAV platform 230 and/or one or more of networks 240-260, and are registered with an appropriate authority for use. For example, UAV platform 230 may compare the credentials with information provided in data storage 235 in order to determine whether one or more UAVs 220 in pool 505 are authenticated for utilizing UAV platform 230 and/or one or more of networks 240-260, and are registered with an appropriate authority. Assume that all UAVs 220 in pool 505 are authenticated and/or registered.

As further shown in FIG. 5A, UAV platform 230 may generate a user interface 520 (e.g., described below in connection with FIG. 5B) that requests mission information (e.g., a mission type, an origination location, etc.) and enables the employee to select a UAV 220 from pool 505. UAV platform 230 may provide user interface 520 to tablet 210, and tablet 210 may display user interface 520 to the employee. The employee may utilize user interface 520 to provide mission information to UAV platform 230, and UAV platform 230 may determine recommended UAVs 525 for the mission based on the mission information. UAV platform 230 may provide information associated with recommended UAVs 525 to tablet 210, via user interface 520, and tablet 210 may display the information associated with recommended UAVs 525 to the employee.

As shown in FIG. 5B, user interface 520 may include a section that requests specification of a mission type, such as a package delivery, a rescue mission, a measurement mission, a surveillance mission, an emergency operation, a UAV mobile hotspot (e.g., a stationary UAV 220, with a constant power source, that provides cellular coverage), etc. User interface 520 may include further information that is based on which mission type is selected. For example, for a package delivery, user interface 520 may request the origination location and the destination location, whereas for other mission types the origination location may not be requested. For example, user interface 520 may also include a section that requests specification of a mission location, such as an origination location (e.g., 123 West Lane, City, State), a destination location (e.g., Latitude: 39° 44' 44" North/Longitude: 75° 32' 48" West), a region, etc. User interface 520 may also include a section that provides information associated with recommended UAVs 525 (e.g., which may be based on which mission type is selected), and requests selection of one or more recommended UAVs 525. The information associated with recommended UAVs 525 may include pictures of recommended UAVs 525; information identifying types of recommended UAVs 525; information identifying recommended UAVs 525 (e.g., brands, model numbers, serial numbers, etc.); information identifying components of recommended UAVs 525 (e.g., cameras, sensors, batteries, rotors, etc.); information identifying software of recommended UAVs 525; costs associated with recommended UAVs 525; etc.

Figure 5C:
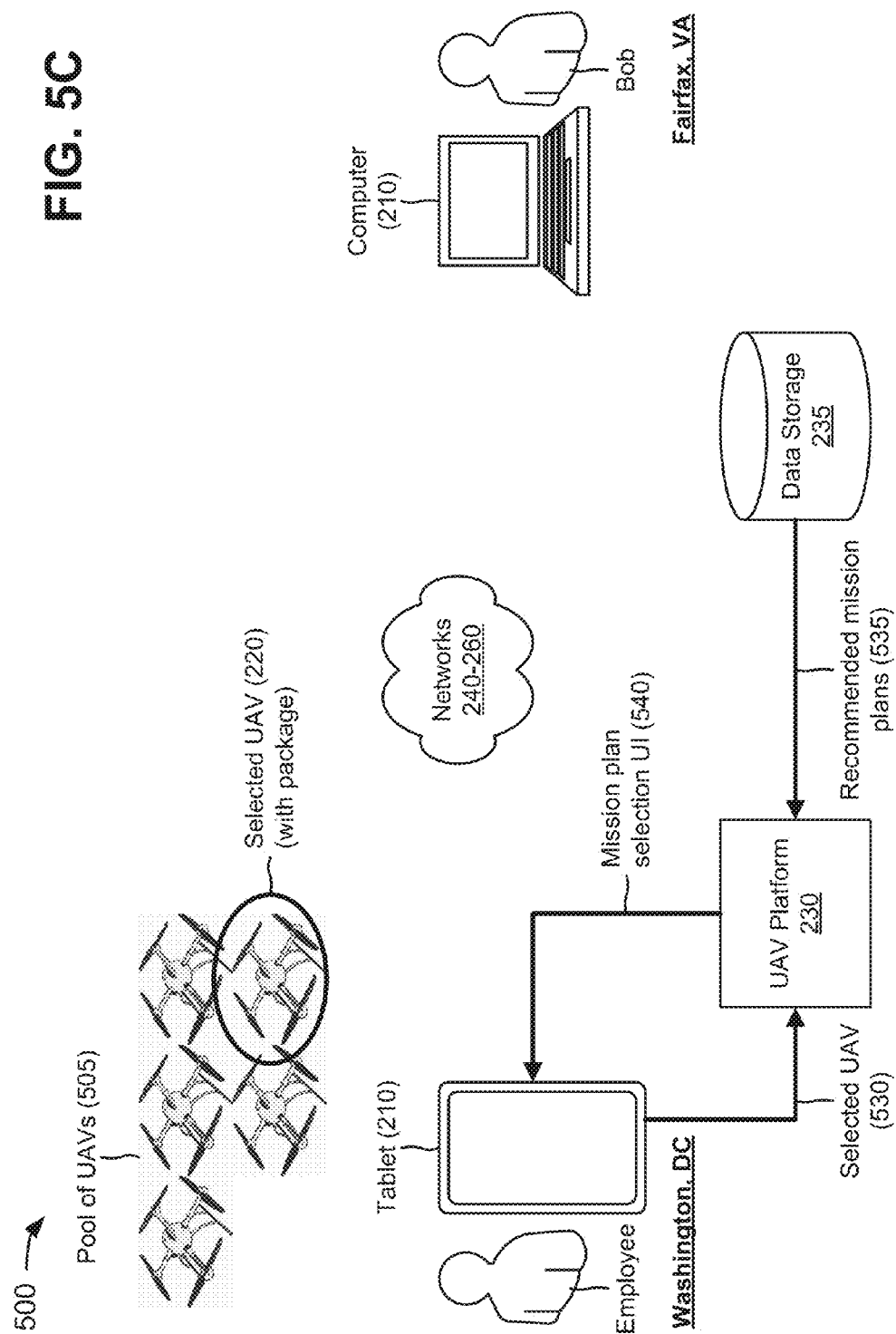

Assume that the employee specifies a package delivery from Washington, D.C. to Fairfax, Va. via user interface 520. Further, assume that the employee selects the Type 1 recommended UAV 525 from user interface 520, and instructs tablet 210 to provide selection 530 to UAV platform 230, as shown in FIG. 5C. As further shown in FIG. 5C, a UAV 220 may be selected from pool 505 (e.g., and indicated as "selected UAV 220 (with package)") based on selection 530. UAV platform 230 may determine recommended mission plans 535 for the mission based on the mission information (e.g., provided via user interface 520) and based on the selected UAV 220. UAV platform 230 may generate a user interface 540 (e.g., described below in connection with FIG. 5D) that displays recommended mission plans 535 and enables the employee to select one of recommended mission plans 535. UAV platform 230 may provide user interface 540 to tablet 210, and tablet 210 may display user interface 540 to the employee.

As shown in FIG. 5D, user interface 540 may display information associated with recommended mission plans 535, and requests selection of one recommended mission plans 535. As shown, recommended mission plans 535 may include a most efficient mission plan (e.g., a shortest distance, a shortest time, etc.) and a flight path associated with the most efficient mission plan; a mission plan that obtains a maximum amount of information (e.g., sensor information, images, video, etc.) and a flight path associated with such a mission plan; and a least expensive mission plan (e.g., least expensive to utilize the selected UAV 220) and a flight path associated with the least expensive mission plan; costs associated with the mission plans; etc.

Assume that the employee selects the most efficient mission plan from recommended mission plans 535 displayed by user interface 540, and instructs tablet 210 to provide the selection to UAV platform 230, as indicated by reference number 545 in FIG. 5E. As further shown in FIG. 5E, UAV platform 230 may utilize a flight path 550 associated with selected mission plan 545, and may generate mission plan instructions 555 for selected mission plan 545. UAV platform 230 may provide mission plan instructions 555 to the selected UAV 220 via one or more of networks 240-260. Mission plan instructions 555 may include information instructing the selected UAV 220 (with the package) to fly north at zero degrees for ten kilometers, fly northeast at forty degrees for three kilometers, at an altitude of one-thousand meters, and deliver the package to Bob in Fairfax, Va. The selected UAV 220 may take off from Washington, D.C. with the package, and may travel flight path 550 based on mission plan instructions 555.

Figure 5F:
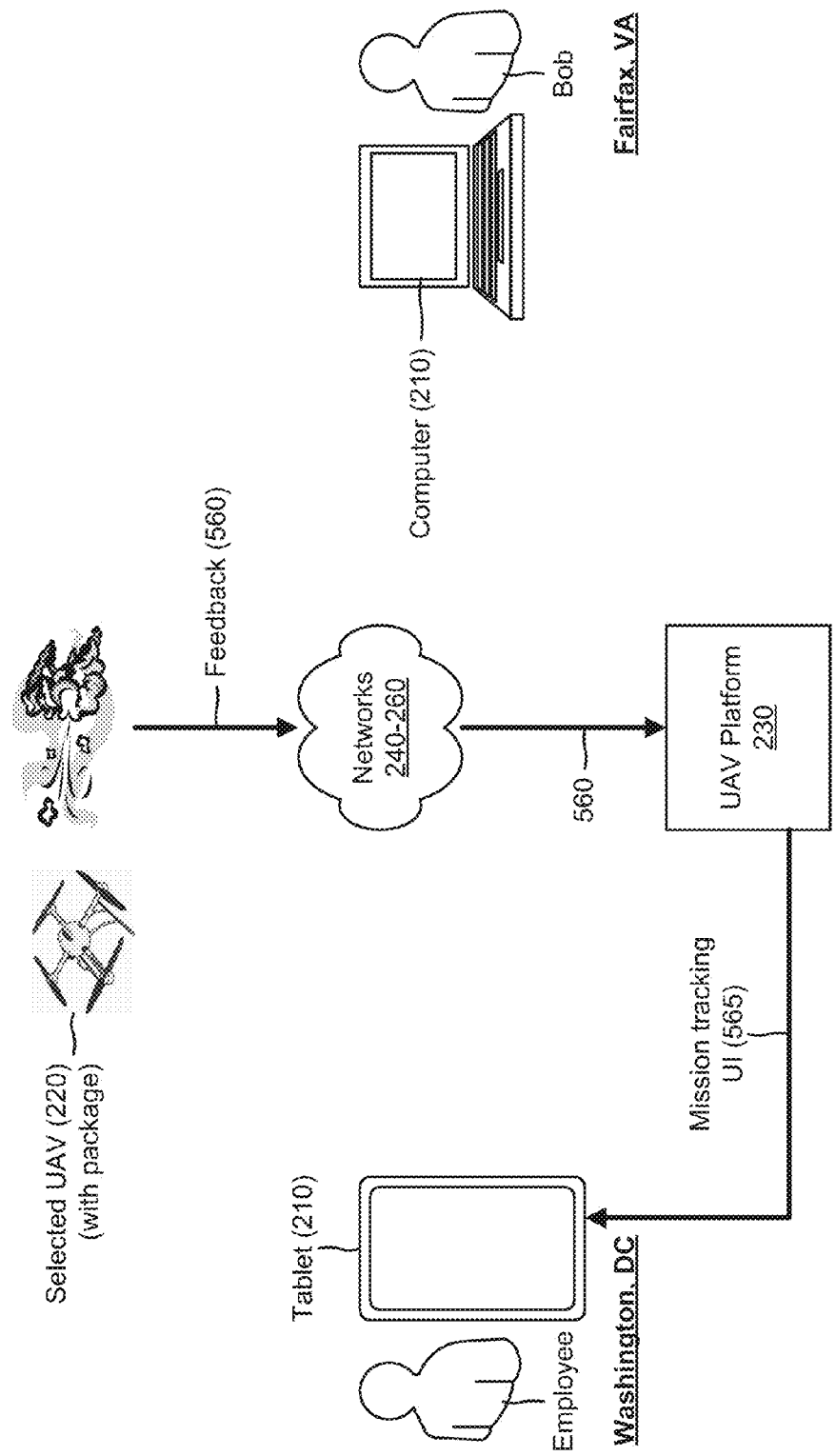

While the selected UAV 220 is traveling along flight path 550, one or more of networks 240-260 may receive feedback 560 from the selected UAV 220 regarding traversal of flight path 550 and/or performance of mission operations by the selected UAV 220 (e.g., changing conditions, such as speed, weather conditions, duration, etc.), as shown in FIG. 5F. Networks 240-260 may provide feedback 560 to UAV platform 230. As further shown in FIG. 5F, UAV platform 230 may generate a user interface 565 (e.g., described below in connection with FIG. 5G) that displays feedback 560 and enables the employee to monitor performance of the mission based on feedback 560. UAV platform 230 may provide user interface 565 to tablet 210, and tablet 210 may display user interface 565 to the employee.

As shown in FIG. 5G, user interface 565 may display information associated with feedback 560 and performance of the mission by the selected UAV 220. As shown, user interface 565 may provide a map of the flight path (e.g., flight path 550) associated with the selected UAV 220; a current location of the selected UAV 220 (e.g., on the map and as "latitude 39° N/longitude 65° E"); a current speed of the selected UAV 220 (e.g., "50 km/h"); a current altitude of the selected UAV (e.g., "1 km"); a battery life remaining for the selected UAV 220 (e.g., "80% battery life"); damaged components of the selected UAV 220 (e.g., "none"); etc.

Figure 5H:
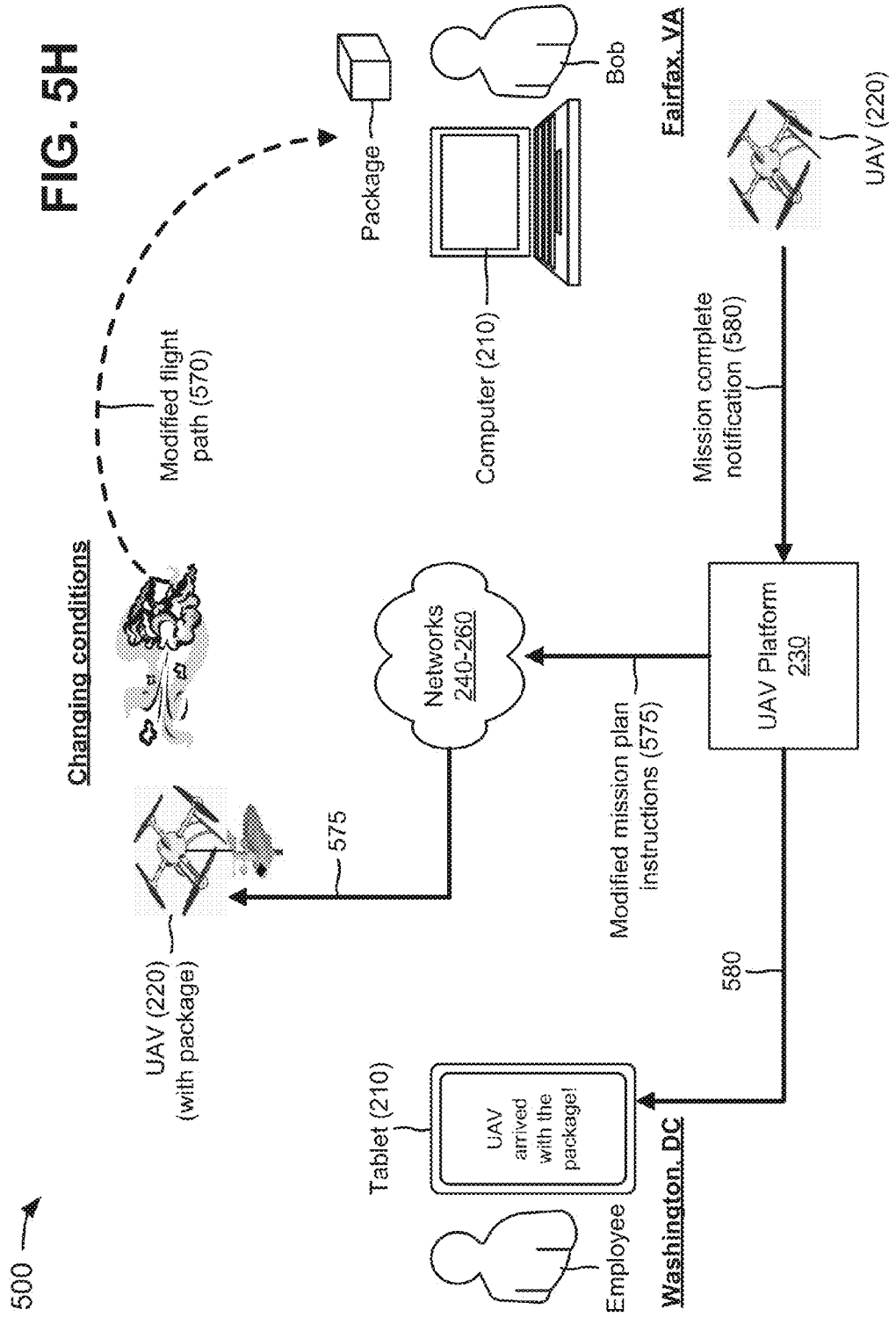

Further, assume that feedback 560 includes information indicating a weather condition (e.g., a headwind) along flight path 550. UAV platform 230 and/or the selected UAV 220 may calculate a modified flight path 570 that enables the selected UAV 220 to avoid the headwind, as shown in FIG. 5H. As further shown in FIG. 5H, UAV platform 230 and/or the selected UAV 220 may generate modified mission plan instructions 575 for modified flight path 570. UAV platform 230 may provide modified mission plan instructions 575 to the selected UAV 220 (e.g., via one or more of networks 240-260). The selected UAV 220 may travel modified flight path 570, based on modified mission plan instructions 575, until the selected UAV 220 arrives at Fairfax, Va. As further shown in FIG. 5H, when the selected UAV 220 arrives at Fairfax, Va., the selected UAV 220 may leave the package at a location where Bob may retrieve the package. The selected UAV 220 and/or computer 210 (e.g., via Bob's input or detection of the presence of the selected UAV 220) may generate a notification 580 indicating that the mission is complete (e.g., that the selected UAV 220 and the package arrived safely at a particular location in Fairfax, Va.), and may provide notification 580 to UAV platform 230. UAV platform 230 may provide notification 580 to tablet 210, and tablet 210 may display notification 580 to the employee, as further shown in FIG. 5H.

As indicated above, FIGS. 5A-5H are provided merely as an example. Other examples are possible and may differ from what was described with regard to FIGS. 5A-5H.

Systems and/or methods described herein may provide a platform that enables UAVs to safely traverse flight paths from origination locations to destination locations. The systems and/or methods may provide user interfaces that enable users of the platform to select the UAVs, manage the UAVs, and define missions for the UAVs, without the need for line of sight control of the UAVs.

To the extent the aforementioned implementations collect, store, or employ personal information provided by individuals, it should be understood that such information shall be used in accordance with all applicable laws concerning protection of personal information. Additionally, the collection, storage, and use of such information may be subject to consent of the individual to such activity, for example, through "opt-in" or "opt-out" processes as may be appropriate for the situation and type of information. Storage and use of personal information may be in an appropriately secure manner reflective of the type of information, for example, through various encryption and anonymization techniques for particularly sensitive information.

The foregoing disclosure provides illustration and description, but is not intended to be exhaustive or to limit the implementations to the precise form disclosed. Modifications and variations are possible in light of the above disclosure or may be acquired from practice of the implementations.

A component is intended to be broadly construed as hardware, firmware, or a combination of hardware and software.

User interfaces may include graphical user interfaces (GUIs) and/or non-graphical user interfaces, such as text-based interfaces. The user interfaces may provide information to users via customized interfaces (e.g., proprietary interfaces) and/or other types of interfaces (e.g., browser-based interfaces, etc.). The user interfaces may receive user inputs via one or more input devices, may be user-configurable (e.g., a user may change the sizes of the user interfaces, information displayed in the user interfaces, color schemes used by the user interfaces, positions of text, images, icons, windows, etc., in the user interfaces, etc.), and/or may not be user-configurable. Information associated with the user interfaces may be selected and/or manipulated by a user (e.g., via a touch screen display, a mouse, a keyboard, a keypad, voice commands, etc.).

It will be apparent that systems and/or methods, as described herein, may be implemented in many different forms of software, firmware, and hardware in the implementations illustrated in the figures. The actual software code or specialized control hardware used to implement these systems and/or methods is not limiting of the implementations. Thus, the operation and behavior of the systems and/or methods were described without reference to the specific software code—it being understood that software and control hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items, and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
    receiving, by a device, a request for a mission that includes traversal of a flight path from a first geographical location to a second geographical location and performance of one or more mission operations;
    presenting, by the device and for display, a first user interface that requests mission information associated with the mission;
    receiving, by the device, the mission information via the first user interface;
    determining, by the device, a plurality of recommended unmanned aerial vehicles for the mission based on the mission information;
    presenting, by the device and for displaying, information associated with the plurality of recommended unmanned aerial vehicles via the first user interface;
    receiving, by the device, a selection of a particular unmanned aerial vehicle, from the information associated with the plurality of recommended unmanned aerial vehicles, via the first user interface;
    determining, by the device, a plurality of recommended mission plans based on the mission information and based on the particular unmanned aerial vehicle;
    presenting, by the device and for displaying, the plurality of recommended mission plans via a second user interface;
    receiving, by the device, a selection of a particular mission plan, from the plurality of recommended mission plans, via the second user interface;
    generating, by the device, mission plan instructions for the particular mission plan,
        the mission plan instructions including flight path instructions for the flight path and mission instructions for the one or more mission operations; and
    providing, by the device, the mission plan instructions to the particular unmanned aerial vehicle to permit the particular unmanned aerial vehicle to travel from the first geographical location to the second geographical location, via the flight path, and to perform the one or more mission operations.

2. The method of claim 1, where the first user interface includes one or more of:
    information requesting a mission type associated with the mission,
    information requesting identification of the first geographical location, or
    information requesting identification of the second geographical location.

3. The method of claim 1, where the plurality of recommended mission plans includes one or more of:
    a mission plan that includes a shortest distance between the first geographical location and the second geographical location,
    a mission plan that includes a shortest time to travel from the first geographical location to the second geographical location,
    a mission plan that obtains a greatest amount of information via the one or more mission operations, or
    a least expensive mission plan.

4. The method of claim 1, further comprising:
    receiving feedback from the particular unmanned aerial vehicle during traversal of the flight path or performance of the one or more mission operations; and
    presenting the feedback, for display, via a third user interface.

5. The method of claim 4, where the third user interface identifies one or more of:
    a map associated with the flight path,
    a current location of the particular unmanned aerial vehicle,
    a current speed of the particular unmanned aerial vehicle,
    a current altitude of the particular unmanned aerial vehicle, or
    component information associated with the particular unmanned aerial vehicle.

6. The method of claim 1, further comprising:
receiving a notification indicating that the mission is complete when the particular unmanned aerial vehicle completes the one or more mission operations; and
presenting the notification, for display, via a fourth user interface.

7. The method of claim 1, where determining the plurality of recommended mission plans comprises:
determining a plurality of mission plans, for the particular unmanned aerial vehicle, based on the mission information;
assigning weights to the mission information;
calculating scores for the plurality of mission plans based on the assigned weights; and
selecting the plurality of recommended mission plans, from the plurality of mission plans, based on the calculated scores.

8. A system, comprising:
one or more devices to:
receive a request for a mission that includes traversal of a flight path from one or more first geographical locations to a second geographical location and performance of one or more mission operations;
present, for display, a first user interface that requests mission information associated with the mission;
receive the mission information via the first user interface;
determine a plurality of recommended unmanned aerial vehicles for the mission based on the mission information;
present, for display, information associated with the plurality of recommended unmanned aerial vehicles via the first user interface;
receive a selection of one or more unmanned aerial vehicles, from the information associated with the plurality of recommended unmanned aerial vehicles, via the first user interface;
determine a plurality of recommended mission plans based on the mission information and based on the one or more unmanned aerial vehicles;
present, for display, the plurality of recommended mission plans via a second user interface;
receive a selection of a particular mission plan, from the plurality of recommended mission plans, via the second user interface;
generate mission plan instructions for the particular mission plan; and
provide the mission plan instructions to the one or more unmanned aerial vehicles to permit the one or more unmanned aerial vehicles to travel from the one or more first geographical locations to the second geographical location, via the flight path, and to perform the one or more mission operations.

9. The system of claim 8, where, when determining the plurality of recommended unmanned aerial vehicles, the one or more devices are further to:
assign weights to capability information associated with a plurality of unmanned aerial vehicles;
calculate scores for the plurality of unmanned aerial vehicles based on the assigned weights; and
determine the plurality of recommended unmanned aerial vehicles, from the plurality of unmanned aerial vehicles, based on the calculated scores.

10. The system of claim 8, where the first user interface includes one or more of:
information requesting a mission type associated with the mission,
information requesting identification of one of the one or more first geographical locations, or
information requesting identification of the second geographical location.

11. The system of claim 8, where the one or more devices are further to:
receive feedback from the one or more unmanned aerial vehicles during traversal of the flight path or performance of the one or more mission operations; and
present the feedback, for display, via a third user interface.

12. The system of claim 11, where the third user interface identifies one or more of:
a map associated with the flight path,
current locations of the one or more unmanned aerial vehicles,
current speeds of the one or more unmanned aerial vehicles,
current altitudes of the one or more unmanned aerial vehicles, or
component information associated with the one or more unmanned aerial vehicles.

13. The system of claim 8, where the one or more devices are further to:
receive a notification indicating that the mission is complete when the one or more unmanned aerial vehicles complete the one or more mission operations; and
present the notification, for display, via a fourth user interface.

14. The system of claim 8, where, when determining the plurality of recommended mission plans, the one or more devices are further to:
determine a plurality of mission plans, for the one or more unmanned aerial vehicles, based on the mission information;
assign weights to the mission information;
calculate scores for the plurality of mission plans based on the assigned weights; and
select the plurality of recommended mission plans, from the plurality of mission plans, based on the calculated scores.

15. A non-transitory computer-readable medium for storing instructions, the instructions comprising:
one or more instructions that, when executed by one or more processors of a device, cause the one or more processors to: receive a request for a mission that includes traversal of a flight path from one or more first geographical locations to a second geographical location and performance of one or more mission operations;
present, for display, a first user interface that requests mission information associated with the mission;
receive the mission information via the first user interface;
determine a plurality of recommended unmanned aerial vehicles for the mission based on the mission information; present, for display, information associated with the plurality of recommended unmanned aerial vehicles via the first user interface;
receive a selection of a particular unmanned aerial vehicle, from the information associated with the plurality of recommended unmanned aerial vehicles, via the first user interface;
determine a plurality of recommended mission plans based on the mission information and based on the particular unmanned aerial vehicle; present, for display, the plurality of recommended mission plans via a second user interface;

receive a selection of a particular mission plan, from the plurality of recommended mission plans, via the second user interface; generate mission plan instructions for the particular mission plan; and provide the mission plan instructions to the particular unmanned aerial vehicle to permit the particular unmanned aerial vehicle to travel from the one or more first geographical locations to the second geographical location, via the flight path, and to perform the one or more mission operations.

16. The computer-readable medium of claim 15, where the first user interface includes one or more of:

information requesting a mission type associated with the mission, information requesting identification of at least one of the one or more first geographical locations, or information requesting identification of the second geographical location.

17. The computer-readable medium of claim 15, where the instructions further comprise:

one or more instructions that, when executed by the one or more processors, cause the one or more processors to at least one of:

receive feedback from the particular unmanned aerial vehicle during traversal of the flight path or performance of the one or more mission operations; and present the feedback, for display, via a third user interface.

18. The computer-readable medium of claim 17, where the third user interface identifies one or more of:

a map associated with the flight path, a current location of the particular unmanned aerial vehicle, a current speed of the particular unmanned aerial vehicle, a current altitude of the particular unmanned aerial vehicle, or component information associated with the particular unmanned aerial vehicle.

19. The computer-readable medium of claim 15, where the instructions further comprise:

one or more instructions that, when executed by the one or more processors, cause the one or more processors to at least one of:

receive a notification indicating that the mission is complete when the particular unmanned aerial vehicle completes the one or more mission operations; and present the notification, for display, via a fourth user interface.

20. The computer-readable medium of claim 15, where the instructions to determine the plurality of recommended mission plans further comprise:

one or more instructions that, when executed by the one or more processors, cause the one or more processors to:

determine a plurality of mission plans, for the particular unmanned aerial vehicle, based on the mission information;

assign weights to the mission information;

calculate scores for the plurality of mission plans based on the assigned weights; and select the plurality of recommended mission plans, from the plurality of mission plans, based on the calculated scores.

* * * * *